United States Patent
Ushiyama

(10) Patent No.: US 8,713,145 B2
(45) Date of Patent: Apr. 29, 2014

(54) INFORMATION DISTRIBUTION SYSTEM, INFORMATION DISTRIBUTING METHOD, NODE, AND RECORDING MEDIUM

(75) Inventor: Kentaro Ushiyama, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 964 days.

(21) Appl. No.: 12/149,494

(22) Filed: May 2, 2008

(65) Prior Publication Data
US 2008/0215663 A1 Sep. 4, 2008

Related U.S. Application Data

(63) Continuation-in-part of application No. PCT/JP2006/322705, filed on Nov. 15, 2006.

(30) Foreign Application Priority Data

Nov. 24, 2005 (JP) .................................. 2005-338863

(51) Int. Cl.
G06F 15/173 (2006.01)
(52) U.S. Cl.
USPC ........................................................ 709/223
(58) Field of Classification Search
USPC .......................................... 709/223, 226, 201
See application file for complete search history.

(56) References Cited

U.S. PATENT DOCUMENTS

| | | | | |
|---|---|---|---|---|
| 5,933,261 | A * | 8/1999 | Fukui et al. ..................... | 398/14 |
| 2002/0143989 | A1 | 10/2002 | Huitema et al. | |
| 2003/0012131 | A1 * | 1/2003 | Venema ......................... | 370/222 |
| 2003/0126122 | A1 * | 7/2003 | Bosley et al. ..................... | 707/3 |
| 2004/0054807 | A1 | 3/2004 | Harvey et al. | |
| 2004/0158650 | A1 * | 8/2004 | Nakamura et al. ................ | 710/1 |
| 2005/0195755 | A1 | 9/2005 | Senta et al. | |
| 2006/0219088 | A1 * | 10/2006 | Okamura ......................... | 84/603 |

FOREIGN PATENT DOCUMENTS

| | | |
|---|---|---|
| JP | A 2002-335269 | 11/2002 |
| JP | A 2003-099337 | 4/2003 |
| JP | A 2003-216521 | 7/2003 |
| JP | A 2003-318720 | 11/2003 |
| JP | A 2004-266796 | 9/2004 |
| JP | A-2006-500831 | 1/2006 |
| WO | WO 2004/027581 | 4/2004 |
| WO | WO 2004/030273 A1 | 4/2004 |

OTHER PUBLICATIONS

Oka T. et al., "Lightweight Load Balancing for Distributed Hash Tables," The Institute of Electronics, Information and Communication Engineers (2004).

(Continued)

*Primary Examiner* — Jason Recek
(74) *Attorney, Agent, or Firm* — Oliff PLC

(57) ABSTRACT

A node is provided in an information distribution system having a plurality of nodes capable of performing communication with each other via a network and in which at least one piece of distribution information is copied and stored into a plurality of nodes, the node managing node information indicative of a node that stores the copied distribution information.

The node includes: node information storing means for storing the node information; dividing determining means, when amount of the stored node information becomes equal to or larger than a predetermined reference amount, for determining that a part of the node information is divided and managed by a new node; and, node information deleting means for deleting the node information managed by the new node from the node information storing means.

31 Claims, 20 Drawing Sheets

(56) References Cited

OTHER PUBLICATIONS

Takemoto D. et al., "Load Balancing Schemes for Dynamic System Configuration in Content-Addressable Network," The Institute of Electronics, Information and Communication Engineers, vol. 103, No. 248, pp. 13-18 (2003).

Yoshida N. et al., "Dynamic Optimization of Peer-to-Peer Systems by Autonomous Index-Server Formation," The Transactions of the Institute of Electronics, Information and Communication Engineers, vol. J86-B, No. 8, pp. 1445-1453 (2003).

Xu J., "On the Fundamental Tradeoffs between Routing Table Size and Network Diameter in Peer-to-Peer Networks," Proceedings of the IEEE Infocom (2003).

Sep. 28, 2010 Office Action issued in Japanese Patent Application No. 2005-085000 (with translation).

* cited by examiner

FIG. 2

ROOTING TABLE OF DHT OF NODE n1

| | AREA OF 0XX<br>NODE ID:002 | AREA OF 1XX<br>NODE ID:122 | AREA OF 2XX<br>NODE ID:221 | AREA OF 3XX<br>NODE ID:301 |
|---|---|---|---|---|
| LEVEL 1 | IP ADDRESS AND PORT NUMBER OF NODE n15 | IP ADDRESS AND PORT NUMBER OF NODE n1 | IP ADDRESS AND PORT NUMBER OF NODE n4 | IP ADDRESS AND PORT NUMBER OF NODE n11 |
| | AREA OF 10X<br>NODE ID:102 | AREA OF 11X<br>NODE ID:112 | AREA OF 12X<br>NODE ID:122 | AREA OF 13X<br>NODE ID:131 |
| LEVEL 2 | IP ADDRESS AND PORT NUMBER OF NODE n8 | IP ADDRESS AND PORT NUMBER OF NODE n13 | IP ADDRESS AND PORT NUMBER OF NODE n1 | IP ADDRESS AND PORT NUMBER OF NODE n10 |
| | NODE ID:120 | NODE ID:121 | NODE ID:122 | (UNREGISTERED) |
| LEVEL 3 | IP ADDRESS AND PORT NUMBER OF NODE n12 | IP ADDRESS AND PORT NUMBER OF NODE n6 | IP ADDRESS AND PORT NUMBER OF NODE n1 | |

NODE ID SPACA OF A DHT

FIG.10

INDEX INFORMATION OF ROOT NODE R1

| No. | CONTENT ID | NODE INFORMATION | | |
|---|---|---|---|---|
| | | IP ADDRESS | PORT NUMBER | AS NUMBER |
| 1 | 111 | 213:139:89:98 | 20001 | 8001 |
| 2 | 111 | 210:19:89:98 | 20001 | 8001 |
| 3 | 111 | 113:13:89:198 | 19901 | 6001 |
| 4 | 111 | 234:19:89:98 | 20001 | 8001 |
| 5 | 111 | 153:139:189:98 | 17701 | 5001 |
| ... | 111 | ... | ... | ... |
| ... | 111 | ... | ... | ... |
| ... | 111 | ... | ... | ... |
| ... | 111 | ... | ... | ... |
| ... | 111 | ... | ... | ... |
| ... | 111 | ... | ... | ... |
| ... | 111 | ... | ... | ... |
| ... | 111 | ... | ... | ... |
| ... | 111 | ... | ... | ... |
| ... | 111 | ... | ... | ... |
| ... | 111 | ... | ... | ... |
| ... | 121 | ... | ... | ... |
| ... | 131 | ... | ... | ... |
| ... | 131 | ... | ... | ... |

51

0% — REFERENCE AMOUNT → 100%

FIG. 17

INDEX INFORMATION OF ROOT NODE R1

| No. | CONTENT ID | NODE INFORMATION | | |
|---|---|---|---|---|
| | | IP ADDRESS | PORT NUMBER | AS NUMBER |
| 1 | 111 | 213:139:89:98 | 20001 | 8001 |
| 2 | 111 | 210:19:89:98 | 20001 | 8001 |
| 3 | 111 | 113:13:89:198 | 19901 | 6001 |
| 4 | 111 | 234:19:89:98 | 20001 | 8001 |
| 5 | 111 | 153:139:189:98 | 17701 | 5001 |
| . | 121 | ..... | ..... | ..... |
| . | 121 | ..... | ..... | ..... |
| . | 131 | ..... | ..... | ..... |
| . | 131 | ..... | ..... | ..... |
| . | 131 | ..... | ..... | ..... |
| . | 141 | ..... | ..... | ..... |
| . | 141 | ..... | ..... | ..... |

0% ← REFERENCE AMOUNT → 100%

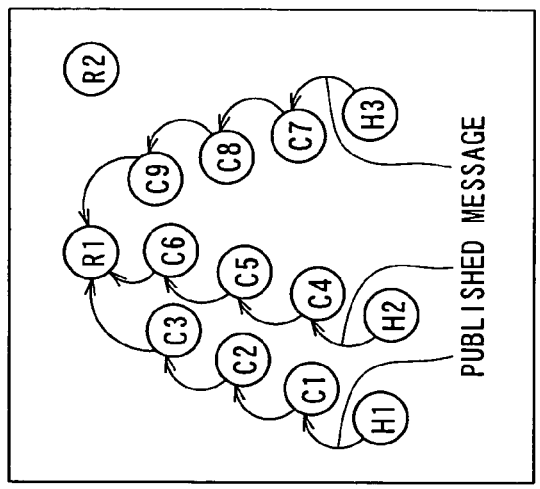
FIG.18C
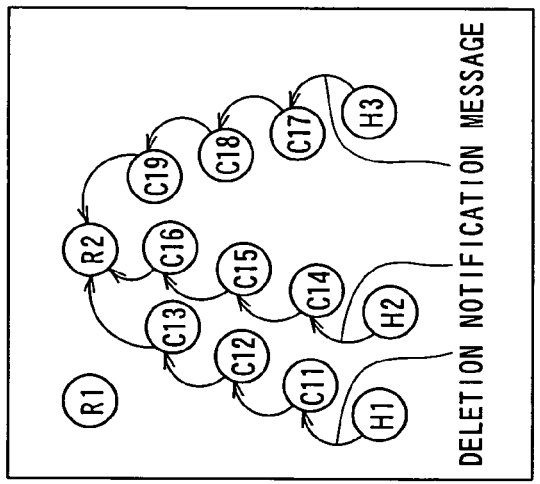
FIG.18B
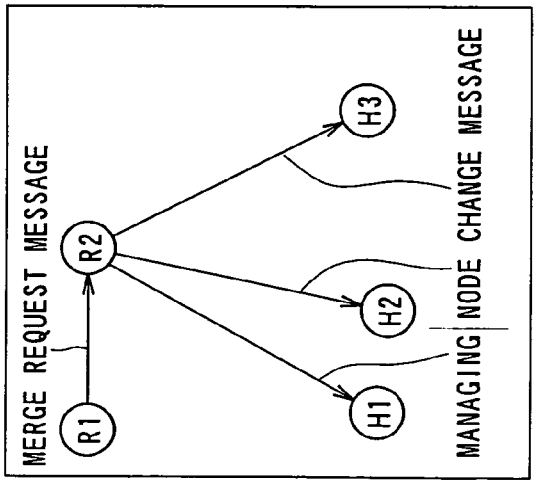
FIG.18A

ND RECORDING MEDIUM

INFORMATION DISTRIBUTION SYSTEM, INFORMATION DISTRIBUTING METHOD, NODE, AND RECORDING MEDIUM

CROSS REFERENCE TO RELATED APPLICATIONS

The present application claims priority from Japanese Patent Application No. 2005-338863, which was filed on Nov. 24, 2005, and the entire disclosure of the Japanese Patent Application including the specification, claims, drawings, and abstract is herein incorporated by reference in its entirety.

BACKGROUND OF THE INVENTION

1. Field of the Invention

The present invention relates to a peer-to-peer (P2P) type information distribution system having a plurality of nodes capable of performing communication with each other via a network. The invention relates to an information distribution system or the like in which at least one piece of distribution information is copied and stored into a plurality of nodes and, more particularly, to the technical field for managing node information indicative of nodes storing the copied distribution information.

2. Discussion of the Related Art

There is known a method of increasing resistance to a failure and dispersibility of accesses by preparing a plurality of pieces of replica information (hereinbelow, called replicas) for one piece of distribution information (for example, content data) in a peer-to-peer information distribution system of this kind and dispersedly disposing (dispersedly storing) the replica information in a plurality of nodes participating in the system.

As a proposal related to generation and allocation of such replicas, for example, patent document 1 discloses a method of generating and allocating replicas in a balanced manner in an entire network in a service group by referring to the whole size (whole information amount) and the number of replicas existing in devices connected in the service group on the network. Patent document 2 discloses a method of dynamically generating replicas in accordance with an access frequency.

In an information distribution system using a distributed hash table (hereinbelow, DHT) as disclosed in non-patent document 1, a node (hereinbelow, called "root node") that manages, as index information, node information (for example, including an IP address and a port number of a content holding node) indicative of a node in which a replica is stored (hereinbelow, called "content holding node") is determined every content data (that is, a root node exists for each content). A node desiring to obtain content data inquires the root node for node information of a node that stores a replica of the content data.

Patent Document 1: Japanese Patent Application Laid-Open No. 2003-99337
Patent Document 2: Japanese Patent Application Laid-Open No. 2003-216521
Non-Patent Document 1: "Lightweight Load Balancing for Distributed Hash Tables", The Institute of Electronics Information and Communication Engineers, Technical Report

SUMMARY OF THE INVENTION

However, when the number of replicas is dynamically increased according to, for example, an access frequency or the like and stored in a number of content holding nodes, since the capacity of a storage area of a root node that stores index information is limited, capacity overflow occurs in the storage area (that is, a situation occurs such that index information cannot be stored any more). A problem arises such that even the number of replicas is increased, the load of accesses to the replicas cannot be dispersed further.

To address the problem, a method of preparing a plurality of content IDs corresponding to, for example, one piece of content data and determining a plurality of root nodes may be considered. The method is performed on the precondition that, as a method of determining a content ID, a general method using a DHT in which each of nodes calculates a hash value from information of content itself is not used but another method is used. In the another method, before entry to the information distribution system, the system administrator determines arbitrary ID numbers in advance and enters content. The content ID number is notified to all of nodes by distributing a content list or the like. The user is allowed to select content from the content list, and a desired content ID is determined. This method can be used in the case of a business form in which content is not freely entered from nodes but is entered from a special node as a distributor while one-dimensionally managing the content. In this case, however, it is assumed that, for example, the efficiency of inquiring the root nodes deteriorates as the access frequency drops. For example, a problem is assumed such that the number of inquiries to a root node is large but the number of inquiries to another root node is small (the root node to which the small number of inquiries are sent is useless and it is unpreferable from the viewpoint of maintenance).

The present invention has been achieved in view of the above drawbacks and the like. An object of the invention is to provide an information distribution system capable of properly changing the number of root nodes in accordance with an index information amount (in other words, capacity of a storage area), an information distributing method, a node, and a recording medium.

In order to solve the above problem, the invention according to claim 1 relates to a node in an information distribution system having a plurality of nodes capable of performing communication with each other via a network and in which at least one piece of distribution information is copied and stored into a plurality of nodes, the node managing node information indicative of a node that stores the copied distribution information, comprising:

node information storing means for storing the node information;

dividing determining means, when amount of the stored node information becomes equal to or larger than a predetermined reference amount, for determining that a part of the node information is divided and managed by a new node; and node information deleting means for deleting the node information managed by the new node from the node information storing means.

BRIEF DESCRIPTION OF DRAWINGS

FIG. 2 is a diagram showing an example of a rooting table of a HDT held in a node n1.

FIG. 10 is a diagram showing an example of node information stored in an index cache area at the time of determining division of node information.

FIG. 17 is a diagram showing an example of node information stored in an index cache area when merging of node information is determined.

FIGS. 18A, 18B, and 18C are diagrams showing an example of the flows of various messages after merging of node information is determined.

DETAILED DESCRIPTION OF THE PREFERRED EMBODIMENTS

Figure 1:
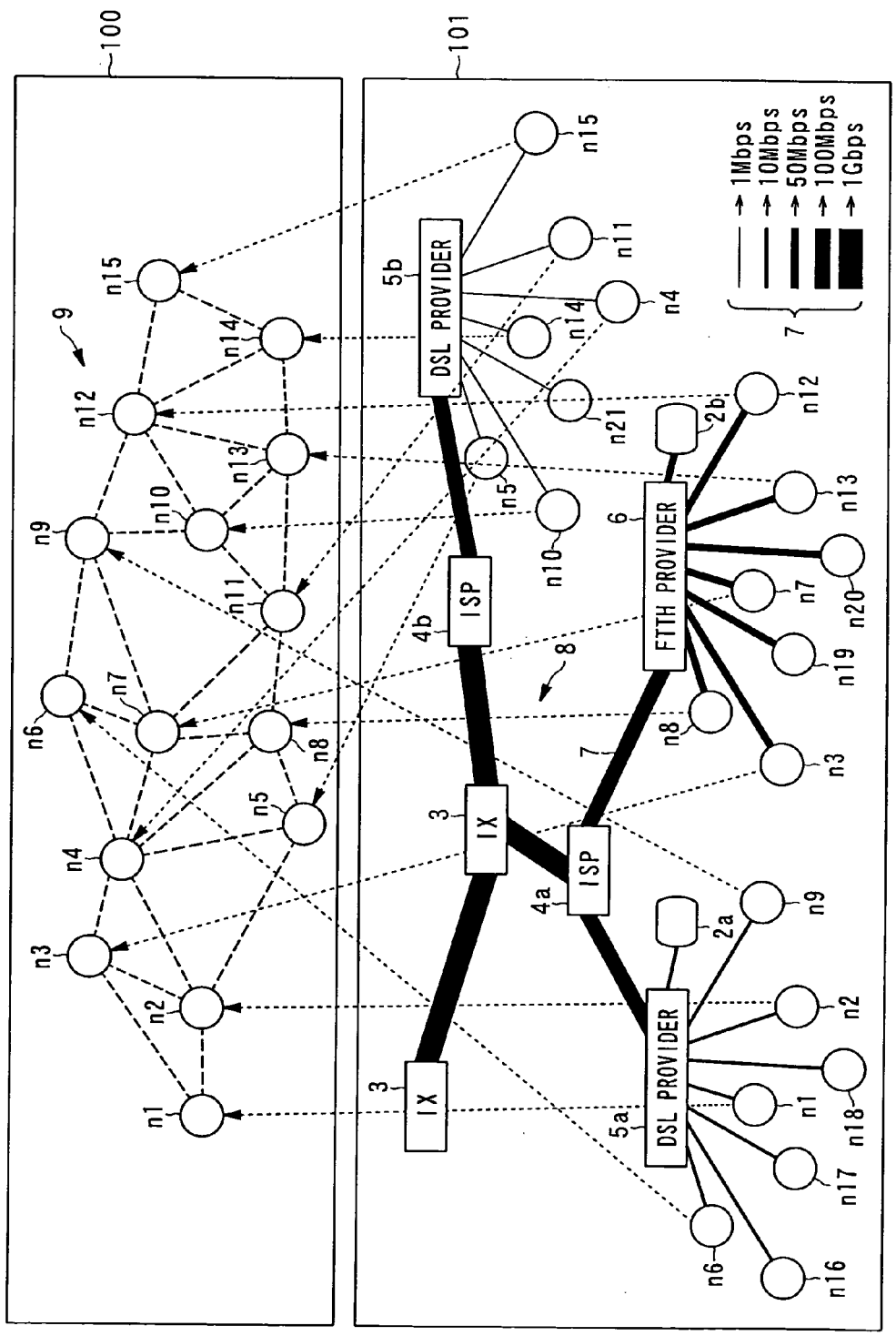
FIG. 1 is a diagram showing an example of a connection mode of each of nodes in a content distribution system as an embodiment.

Preferred embodiments for carrying out the present invention will now be described with reference to the drawings. The following embodiments relate to the case where the present invention is applied to a content distribution system.

Each designation of numerical references in the drawings is typically as follows:

nn node
8 network
9 overlay network
11 controller
12 storage
13 buffer memory
14 decoder
15 video processor
16 display
17 sound processor
18 speaker
20 communication unit
21 input unit
22 bus
S content distribution system 1. Configuration and the Like of Content Distribution System First, a schematic configuration and the like of a content distribution system as an example of an information distribution system will be described with reference to FIG. 1.

FIG. 1 is a diagram showing an example of a connection mode of nodes in a content distribution system as an embodiment.

As shown in a lower frame 101 in FIG. 1, a network 8 such as the Internet (network in the real world) is constructed by IXs 3 (Internet exchanges), ISPs (Internet Service Providers) 4a and 4b, DSL (Digital Subscriber Line) providers (apparatuses) 5a and 5b, FTTH (Fiber To The Home) providers (apparatuses) 6, communication lines (for example, telephone lines, optical cables, and the like) 7, and so on. Although routers for transferring a message (packet) are properly inserted in the network (communication network) 8 in the example of FIG. 1, they are not shown.

A content distribution system S is constructed by including a plurality of node devices (hereinbelow, simply called "nodes") n1, n2, . . . and n21 connected to each other via the network 8. The content distribution system S is a peer-to-peer network system (in reality, more nodes exist). Unique serial numbers and IP (Internet Protocol) addresses (global IP addresses) are assigned to the nodes n1 to n21. The serial numbers and the IP addresses are unique to the plurality of nodes.

The content distribution system S has a content management server 2a and a content list management server 2b.

In the content distribution system S, an overlay network 9 as shown in an upper frame 100 in FIG. 1 is configured by an algorithm using a specific algorithm such as the DHT. Specifically, the overlay network 9 denotes a network (logical network) in which a virtual link formed by using the existing network 8 is constructed.

The embodiment is based on the overlay network 9 configured by an algorithm using the DHT. Any of nodes n1 to n15 disposed on the overlay network 9 (in the upper frame 100 in FIG. 1) will be called a node "nn" participating in the overlay network 9. In other words, the overlay network 9 is formed by participation of the nodes nn. Any of nodes n16 to n21 which are not participated in the overlay network 9 can participate in the overlay network 9 by sending a participation message as participation request information indicative of a participation request to an arbitrary node nn already participating in the overlay network 9.

Each node nn has a node ID as unique node identification information. The node ID is a value (having a bit length of, for example, 160 bits) obtained by hashing the IP address or serial number with a common hash function (for example, SHA-1). With the node IDs, the nodes can be disposed so as to be uniformly spread in a single ID space.

When the IP addresses or serial numbers are different from each other, the probability that the node IDs obtained (hashed) with the common hash function have the same value is extremely low. Since the hash function is known, the details will not be described.

Each of the nodes nn has a DHT. In the DHT, transfer destinations of various messages on the overlay network 9 are specified. Concretely, the DHT includes a routing table (transfer destination table) in which a plurality of sets of the node IDs, IP addresses, port numbers, and the like of the nodes nn properly apart from each other in the node ID space are registered.

Figure 3:
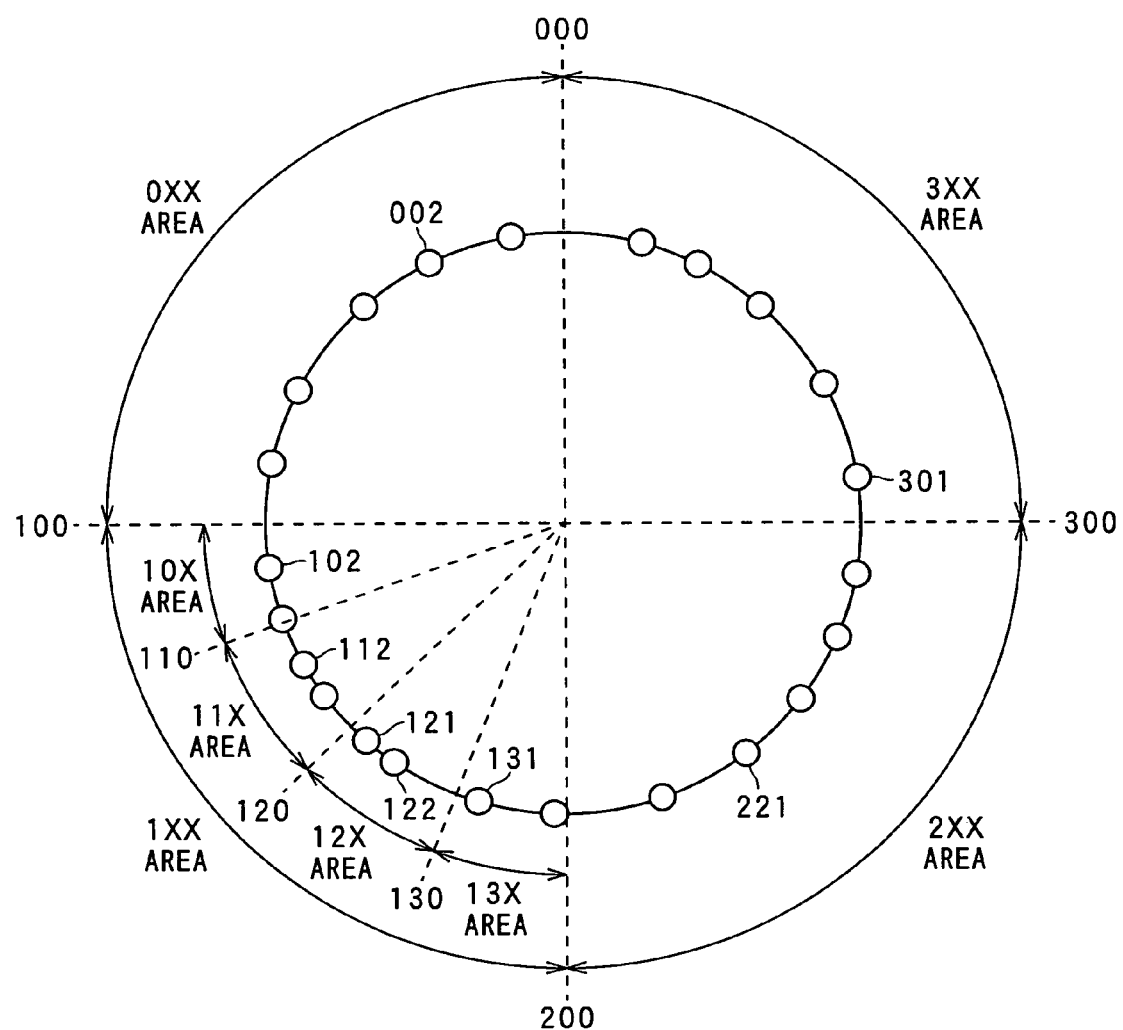
FIG. 3 is a conceptual diagram showing an example of a node ID space of a DHT.

FIG. 2 is a diagram showing an example of the routing table of the DHT held in the node n1. FIG. 3 is a conceptual diagram showing an example of the node ID space of the DHT.

In the examples of FIGS. 2 and 3, for convenience of description, the bit length of a node ID is "2 bits×3 digits 6 bits" and each digit is expressed in quaternary form (integers of 0 to 3) (in reality, the longer bit length is used, and each digit is divided into, for example, four bits and expressed in hexadecimal of 0 to f).

In the example of FIG. 2, the routing table of the DHT is made of tables of levels 1 to 3 (divided into a plurality of levels). As table entries at each of levels, the node ID and the IP address and the port number of a node nn corresponding to the node ID are associated and registered. Each of areas in the table at each level is an area obtained by dividing the node ID space of the DHT. For example, as shown in FIG. 3, at level 1, the entire node ID space of the DHT is divided into four areas. An area in which node IDs "000" to "033" exist is set as a 0XX area. An area in which node IDs "100" to "133" exist is set as a 1XX area. An area in which node IDs "200" to "233" exist is set as a 2XX area. An area in which node IDs "300" to "333" exist is set as a 3XX area. At level 2, each of the areas at level 1 (that is, the 0XX to 3XX areas) is further divided into four areas. For example, the 1XX area is divided into four areas. An area in which node IDs "100" to "103" exist is set as a 10X area. An area in which node IDs "110" to "113" exist is set as a 11X area. An area in which node IDs "120" to "123" exist is set as a 12X area. An area in which node IDs "130" to "133" exist is set as a 13X area.

For example, when the node ID of the node n1 is "122", as shown in FIG. 2, in the table of the 1XX area (the area where the node n1 itself exists) at the level 1 of the node n1, the node ID and the IP address of itself are registered (since the IP address is of the node n1, it may not be registered in the routing table). In each of areas where the node n1 itself does not exist (that is, the 0XX area, 2XX area, and 3XX area), the node ID, IP address, and the like of another arbitrary node nn are registered.

In a table of the 12X area (where the node n1 itself exists) at the level 2 of the node n1, as shown in FIG. 2, the node ID, the IP address of itself, and the like are registered (since the IP address is of the node n1, it may not be registered in the routing table). In each of areas where the node n1 itself does not exist (that is, the 10X area, 11X area, and 13X area) and the like, the node ID, IP address, and the like of another arbitrary node nn are registered.

Further, at the level 3 of the node n1, as shown in FIG. 2, the node IDs, the IP addresses, and the like of node IDs "120" to "122" are registered (since the IP address is of the node n1, it may not be registered in the routing table).

In the examples of FIGS. 2 and 3, the bit length of a node ID is "3 digits×2 bits" so that a table of three levels 1 to 3 can cover the bits. However, when the bit length of a node ID increases, a table of the increased bit length is necessary (for example, when the bit length of a node ID is "16 digits×4 bits", a table of 16 levels is necessary).

As described above, in the routing table of the DHT in the embodiment, the higher the level is, the narrower the area is.

Such a DHT is given when a node which has not participated participates in the overlay network 9.

In the overlay network 9, replicas of data (an example of distribution information) of various content (such as movies and music) are stored so as to be spread din the plurality of nodes nn. For example, replicas of content data of a movie whose title is XXX are stored in the nodes n1 and n4. On the other hand, replicas of content data of a movie whose title is YYY are stored in the nodes n2 and n3. The replicas are stored so as to be spread to the nodes nn as a plurality of content holding nodes. To each of the replicas of the content data, information such as the content name (title) and content ID (identification information peculiar to the content) is added. The content ID is generated, for example, by hashing the content name+arbitrary numerical value (or a few bytes from the head of the content data) with the same hash function as that used for obtaining the node ID (the content ID is disposed in the same ID space as that of the node ID). Alternatively, the system administrator may assign a unique ID value (having the same bit length as that of the node ID) to each content. In this case, a "content list" in which the correspondence between the content title or the like and the content ID is written is distributed to all of the nodes nn.

Index information is managed by a root node as described above. The index information indicates the positions of replicas of content data stored so as to be spread (and includes node information (such as the IP address and the port number) of each of content holding nodes storing the replicas). For example, the index information of a replica of content data of the movie whose title is XXX is managed by the node n13 as the root node of the content (content ID). The index information of a replica of content data of the movie whose title is YYY is managed by a node n14 as the root node of the content (content ID). That is, since the root node is assigned for each content, the load is distributed. Moreover, even in the case where replicas of the same content data (the same content ID) are stored in a plurality of content holding nodes, the index information of the replicas of the content data can be managed by a single root node. For example, such a root node is determined to be anode nn having the node ID closest to the content ID (for example, a node having the largest number of upper digits matched with those of the content ID).

Distributed storage of replicas of content data is controlled by, for example, the content management server 2a (or by a very-reliable node nn always participating in the overlay network 9 selected by the system administrator). For example, the content management server 2a regularly calculates the frequency of access to content data (the content holding node) and the popularity of content data (for example, from the root nodes and content holding nodes) and determines whether the number of replicas to be stored is increased or decreased on the content unit basis. When it is determined that the number of replicas is increased, the content management server 2a selects an arbitrary node nn in which a replica is to be stored (for example, at random), requests the selected node nn to store the replica, when there is a response to accept storage of the replica from the node nn, copies the content data, and distributes the replica to the node nn so that the replica is stored. On the other hand, when it is determined that the number of replicas is to be decreased, the content management server 2a selects an arbitrary node nn storing the replica (for example, nodes are selected at random from the index information obtained from the root node), and requests the selected node nn to delete the replica, thereby deleting the replica from the node nn.

The control of the distributed storage of replicas of content data by the content management server 2a may not be performed. For example, simply, popular content is downloaded by many nodes nn, so that the number of replicas of the content increases naturally. On the other hand, content whose popularity is decreasing is deleted by the node nn, so that the number of replicas of the content decreases naturally.

The node nn (content holding node) storing the replica transmits a published (registration notification) message toward a root node to notify the root node of the fact that the replica is stored. The published message includes the content ID added to the replica and the node information of itself (the IP address, the port number, and the like) (since the replica is stored, registration request information indicative of a request for registration of the node information). In such a manner, the published message arrives at the root node by the DHT routing using the content ID as a key.

On the other hand, the node nn (content holding node) that deleted the replica transmits a deletion notification message toward the root node to notify the root node of deletion of the replica. The deletion notification message (since the replica is deleted, deletion request information indicative of a node information deleting request) includes the content ID added to the replica and the node information of the node nn itself. The deletion notification message arrives at the root node by the DHT routing using the content ID as a key.

Figure 4A:
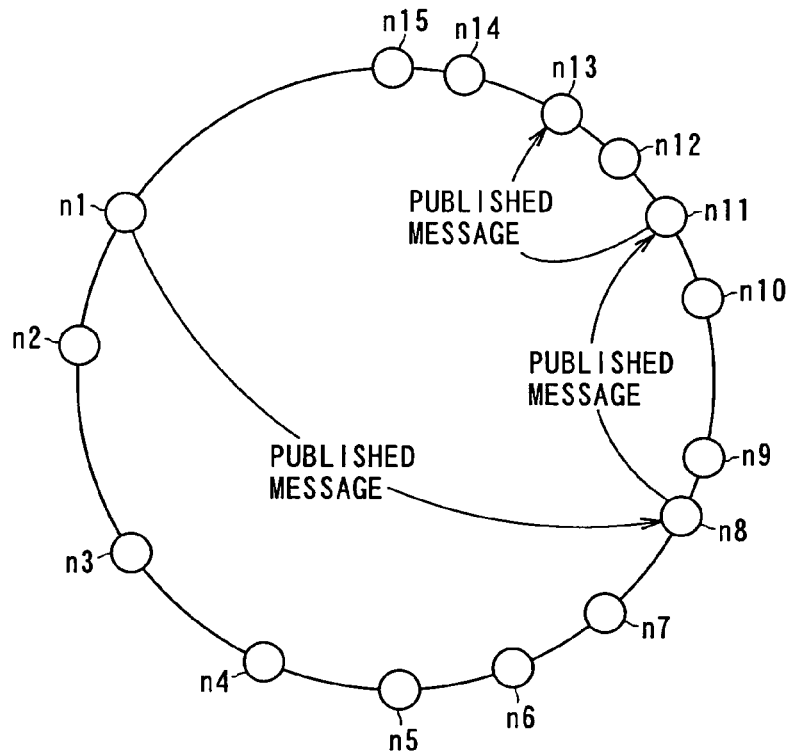
FIG. 4A is a conceptual diagram showing an example of the flow of a published message transmitted from a content holding node.
Figure 4B:
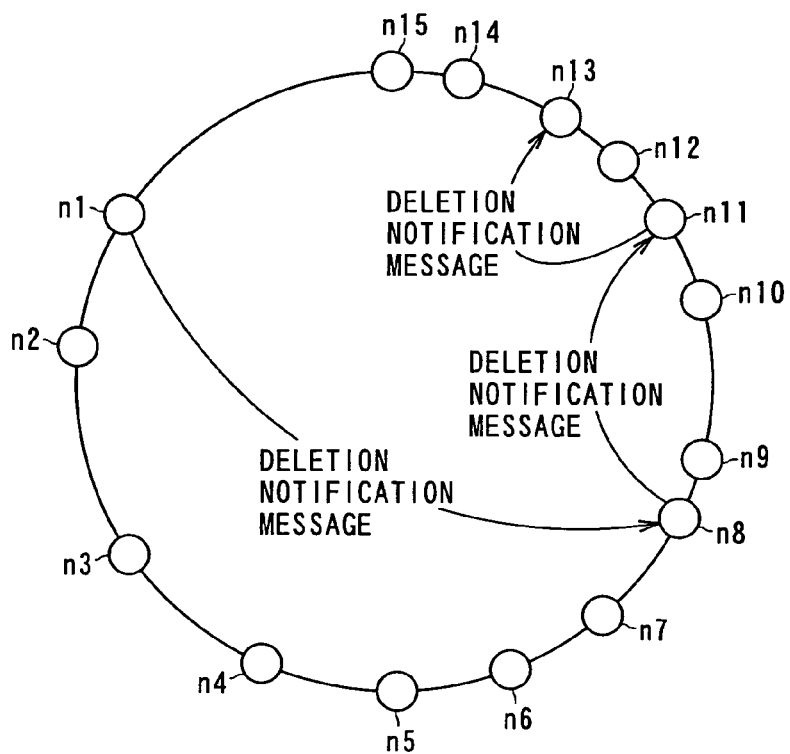
FIG. 4B is a conceptual diagram showing an example of the flow of a deletion notification message transmitted from the content holding node, in a node ID space of a DHT.

FIGS. 4A and 4B are conceptual diagrams showing an example of the flow of the published message transmitted from the content holding node and an example of the flow of the deletion notification message transmitted from the content holding node, respectively, in the node ID space in the DHT.

In the example of FIG. 4A, for example, the node n1 as a content holding node obtains the IP address and the port number of the node n8 having the node ID closest to the content ID included in a published message (for example, the node ID having the largest number of upper digits matched with those of the content ID) with reference to the table of the level 1 of the DHT of itself. The node n1 transmits the published message to the IP address and the port number.

The node n8 receives the published message, with reference to the table of the level 2 of the DHT of itself, obtains, for example, the IP address and the port number of the node n11 having the node ID closest to the content ID included in the published message (for example, the node ID having the largest number of upper digits matched with those of the content ID), and transfers the published message to the IP address and the port number.

On the other hand, the node n11 receives the published message, with reference to the table of the level 3 of the DHT of itself, obtains, for example, the IP address and the port number of the node n13 having the node ID closest to the content ID included in the published message (for example, the node ID having the largest number of upper digits matched with those of the content ID), and transfers the published message to the IP address and the port number.

The node n13 receives the published message, with reference to the table of the level 4 of the DHT of itself, recognizes that the node is the node having the node ID closest to the content ID included in the published message (for example, the node ID having the largest number of upper digits matched with those of the content ID), that is, the node itself is the root node of the content ID, and registers the node information included in the published message into the index information of itself.

The node information included in the published message is also registered (cached) in nodes nn (the nodes n8 and nil in the example of FIG. 4A) existing in the transfer path extending from the content holding node to the root node (in the following, the node nn caching the node information will be called a cache node). That is, the published message indicates a request to register the node information also in the cache node in the transfer path to the root node.

The flow of the deletion notification message in the example of FIG. 4B is similar to that of the published message in the example of FIG. 4A. The deletion notification message transmitted from the node n1 as the content holding node is transferred to the node n13 as the root node of the content ID. The node n13 deletes the node information included in the deletion notification message from the index information of itself.

The node information included in the deletion notification message is deleted also in the cache node (in the example of FIG. 4A, the nodes n8 and n11 caching the node information) in the transfer path extending from the content holding node to the root node. That is, the deletion notification message indicates a request to delete the node information also in the cache nodes in the transfer path to the root node. Consequently, the old node information managed in the cache nodes in the transfer path to the root node can be also deleted reliably.

In the case where the user at a node nn wishes to obtain a replica of desired content data, the node nn to obtain the replica (hereinbelow, called "user node") transmits a content location inquiring (retrieving) message to another node nn in accordance with the routing table of itself. The message includes the content ID of the content data (selected from the content list (in which the content name, the content ID, and the like are written and which is managed by, for example, the content list management server 2b) distributed to all of the nodes nn) selected by the user. Like the published message, the content location inquiring message is transferred via some nodes nn (hereinbelow, called "relay nodes") by the DHT routing using the content ID as a key and reaches the root node of the content ID. The user node obtains (receives) the index information from the root node, connects it to the content holding node that holds the replica of the content data on the basis of the node information included in the index information, and can obtain (download) the replica of the content data.

The user node can also obtain (receive) the node information from the cache node caching the same node information as that in the root node before the content location inquiring message reaches the root node.

The content list may be managed by the very-reliable node nn always participating in the overlay network 9 and selected by the system administrator (in this case, the content list management server 2b is not always necessary). In the content list, the content ID may not be described. Each of the user nodes may generate a content ID by hashing "the content name described in the content list+arbitrary numerical value" with the hash function.

As described above, when the number of replicas is dynamically increased according to, for example, an access frequency or the like and stored in a number of content holding nodes, since the capacity of a storage area of a root node that stores index information (hereinbelow, called "index cache area") is limited, capacity overflow occurs in the storage area.

In the embodiment, when the amount of all of node information included in the index information (for example, the data amount of node information) becomes equal to or larger than a predetermined reference amount, the root node determines that a part of the node information is divided and managed by a new root node, and deletes the divided node information from the index information. As a result, the index information of one piece of content is managed by a plurality of root nodes. The detailed flow until a new root node manages the node information divided will be described later.

As described above, when the replicas are dynamically decreased (deleted from the content holding nodes) in accordance with access frequency or the like, for example, the efficiency of an inquiry to the root node deteriorates.

In the embodiment, when the amount of all of node information included in the index information becomes equal to or smaller than a predetermined reference amount, the original root node determines that the node information divided and managed by a new root node is merged with the stored node information (to restore the original index information). The detailed flow until the original root node merges the divided node information and manages the resultant information will be described later.

The configuration and function of the node nn will now be described with reference to FIG. 5.

Figure 5:
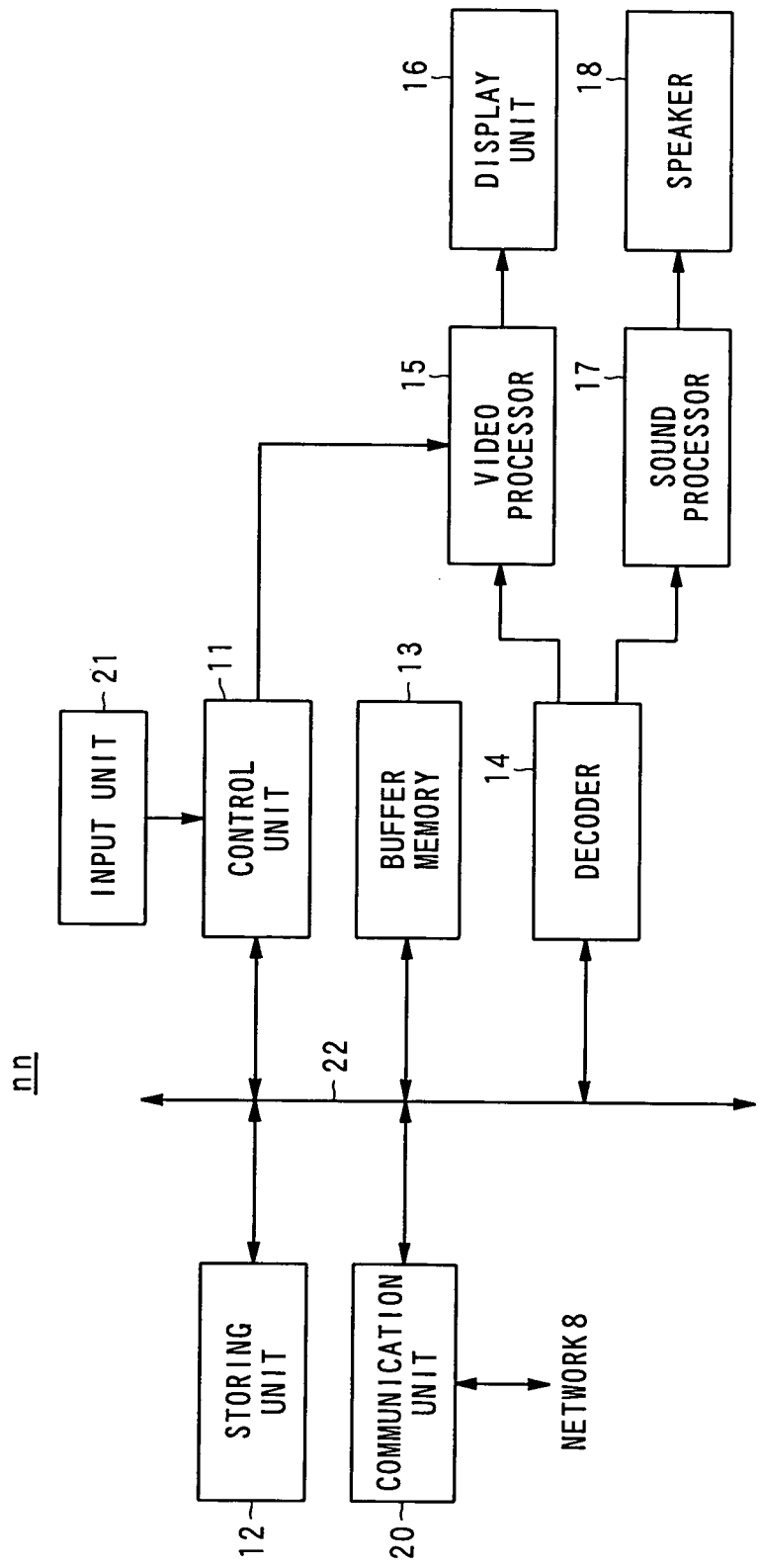
FIG. 5 is a diagram showing an example of a schematic configuration of a node nn.

FIG. 5 is a diagram showing an example of a schematic configuration of the node nn.

As shown in FIG. 5, the node nn has: a control unit 11 as a computer constructed by a CPU having a computing function, a work RAM, a ROM for storing various data and programs, and the like; a storing unit 12 as node information storing means such as an HDD for storing various data (for example, a replica of content data, node information, and DHT), programs, and the like; a buffer memory 13 for temporarily storing a replica of received content data; a decoder 14 for decoding (decompressing, decrypting, or the like) encoded video data (video information) and audio data (sound information) and the like included in the replica of the content data; a video processor 15 for performing a predetermined drawing process on the decoded video data and the like and outputting the resultant data as a video signal; a display unit 16 such as a CRT or a liquid crystal display for displaying a video image on the basis of the video signal output from the video processor 15; a sound processor 17 for digital-to-analog (D/A) converting the decoded audio data to an analog audio signal, amplifying the analog audio signal by an amplifier, and outputting the amplified signal; a speaker 18 for outputting the audio signal output from the sound processor 17 as sound waves; a communication unit 20 for performing communication control on information to/from another node nn via the network 8; and an input unit (such as a keyboard, a mouse, and an operation panel) 21 for receiving an instruction from the user and supplying an instruction signal according to the instruction to the control unit 11. The control unit 11, the storing unit 12, the buffer memory 13, the decoder 14, and the communication unit 20 are connected to each other via a bus 22.

In such a configuration, the control unit 11 controls the whole by reading and executing the programs (including a node process program of the present invention) stored in the storing unit 12 or the like by the CPU. The control unit 11 performs the process as at least one of the user node, the relay node, the root node, the cache node, and the content holding node. Particularly, in the case of the root node, the control unit 11 functions as parting determining means, belonged-group information obtaining means, access frequency information obtaining means, node information deleting means, managing node changing information transmitting means, merge determining means, merge information transmitting means, and the like. In the case of the content holding node, the control unit 11 functions as registration request information transmitting means, deletion request information transmitting means, and the like, and perform various processes which will be described later.

To the index cache area, for example, a few kB (kilobytes) to a few MB (megabytes) out of the storage area in the storing unit 12 are allocated.

For example, the node process program may be downloaded from a predetermined server on the network 8 or recorded on a recording medium such as a CD-ROM and read via a drive of the recording medium.

2. Operation of Content Distribution System

Next, an example of the operation of the content distribution system S when node information is registered, divided, deleted, and merged will be described.

2-1. Registration and Division of Node Information

First, an example of the operation when node information is registered and divided will be described with reference to FIGS. 6 to 11.

Figure 6:
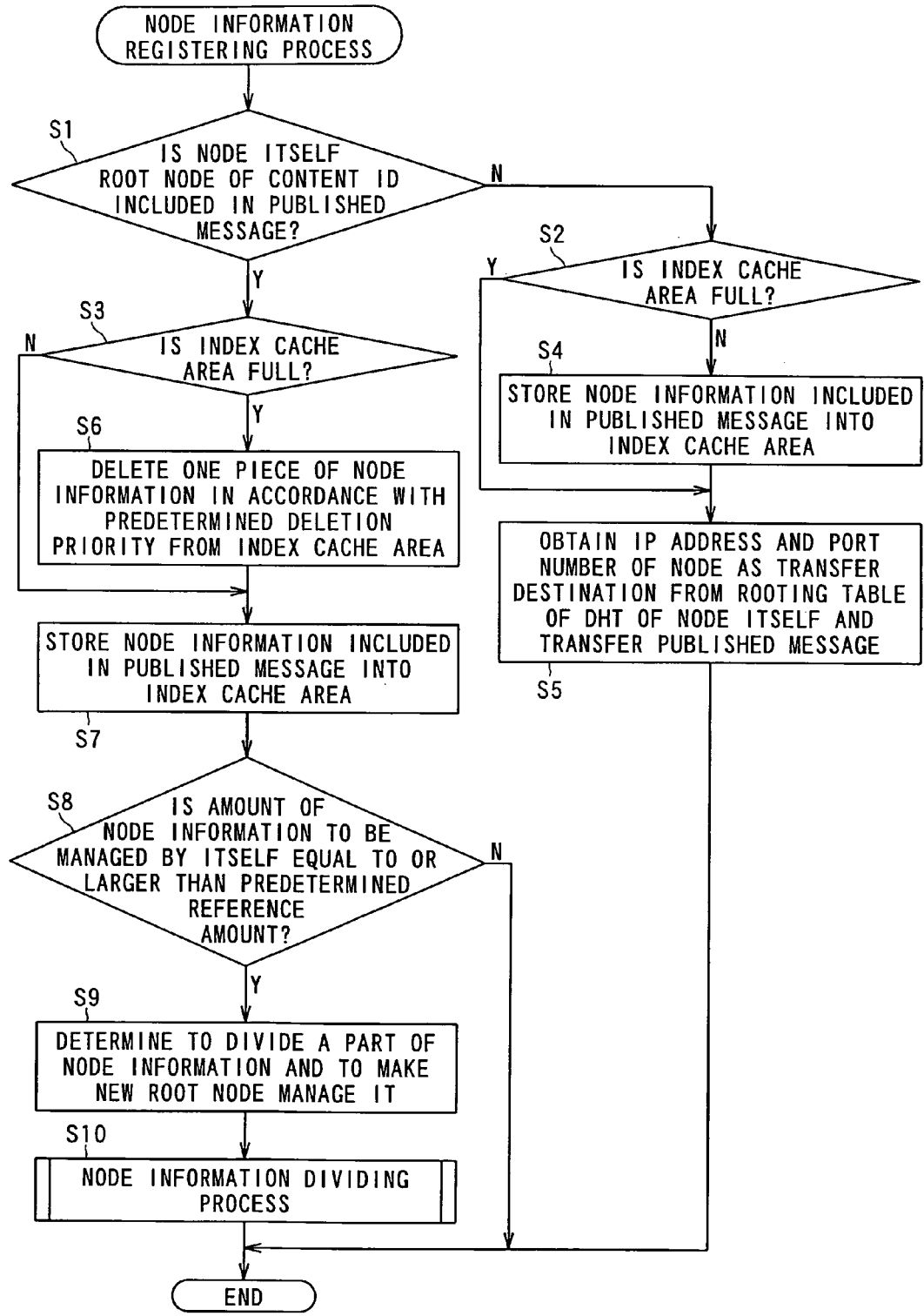
FIG. 6 is a flowchart showing an example of a node information registering process in the node nn.
Figure 7:
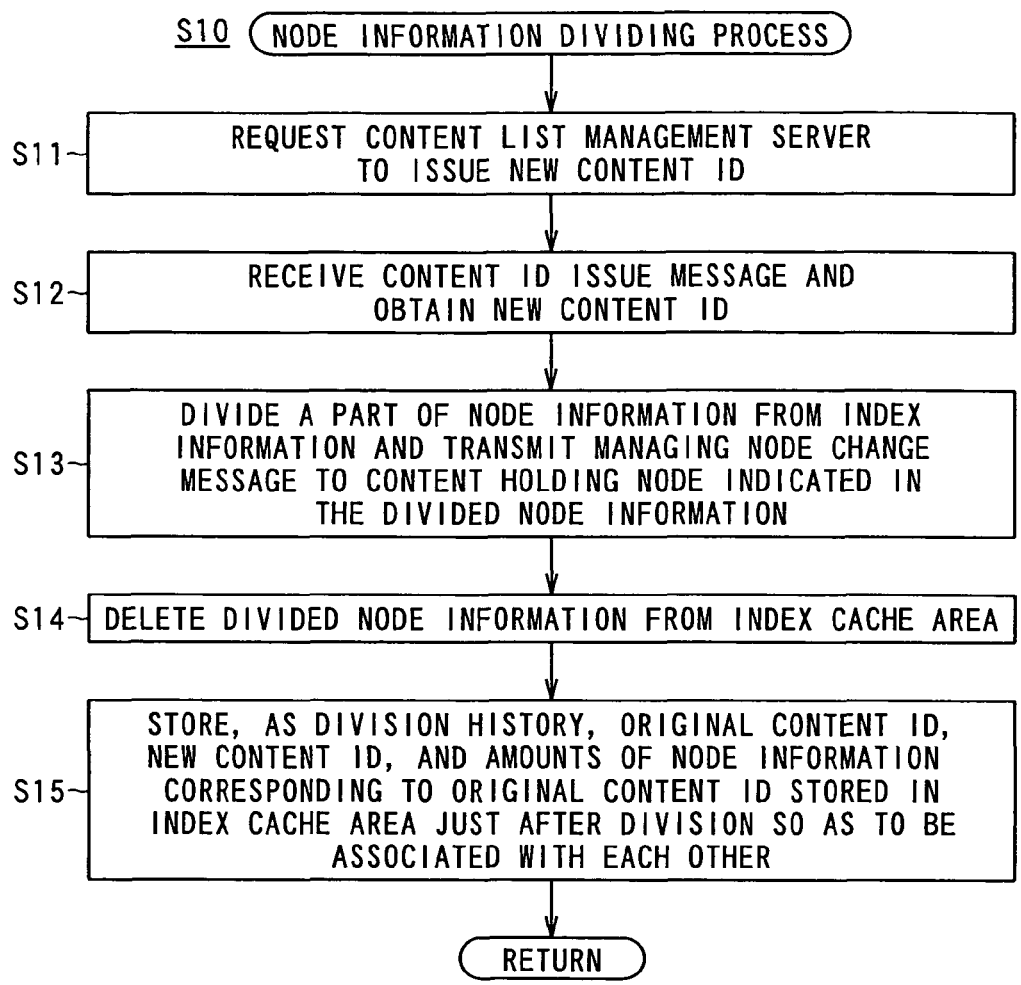
FIG. 7 is a flowchart showing an example of a node information dividing process in the node nn.
Figure 8:
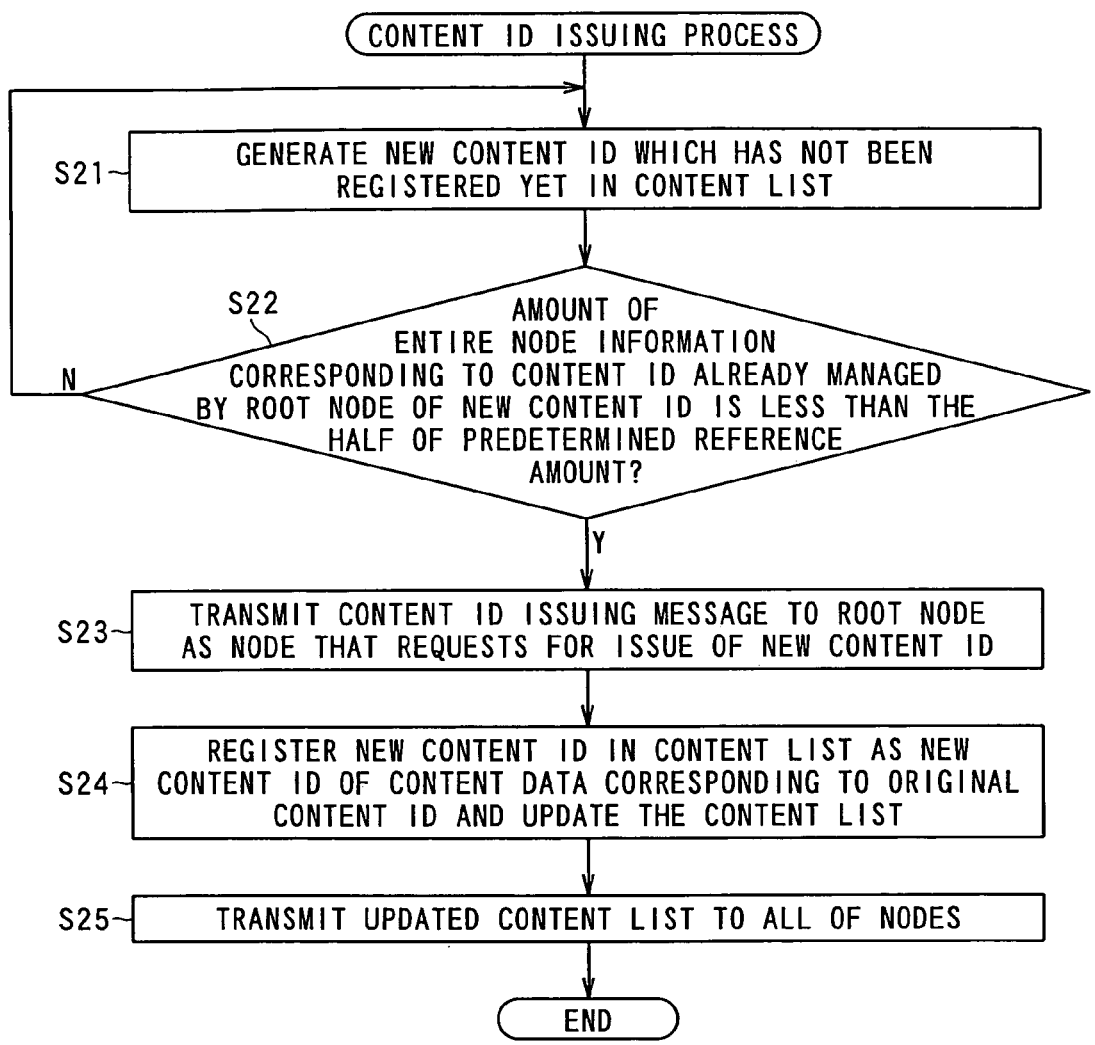
FIG. 8 is a flowchart showing an example of a content ID changing process in the node nn.
Figure 9:
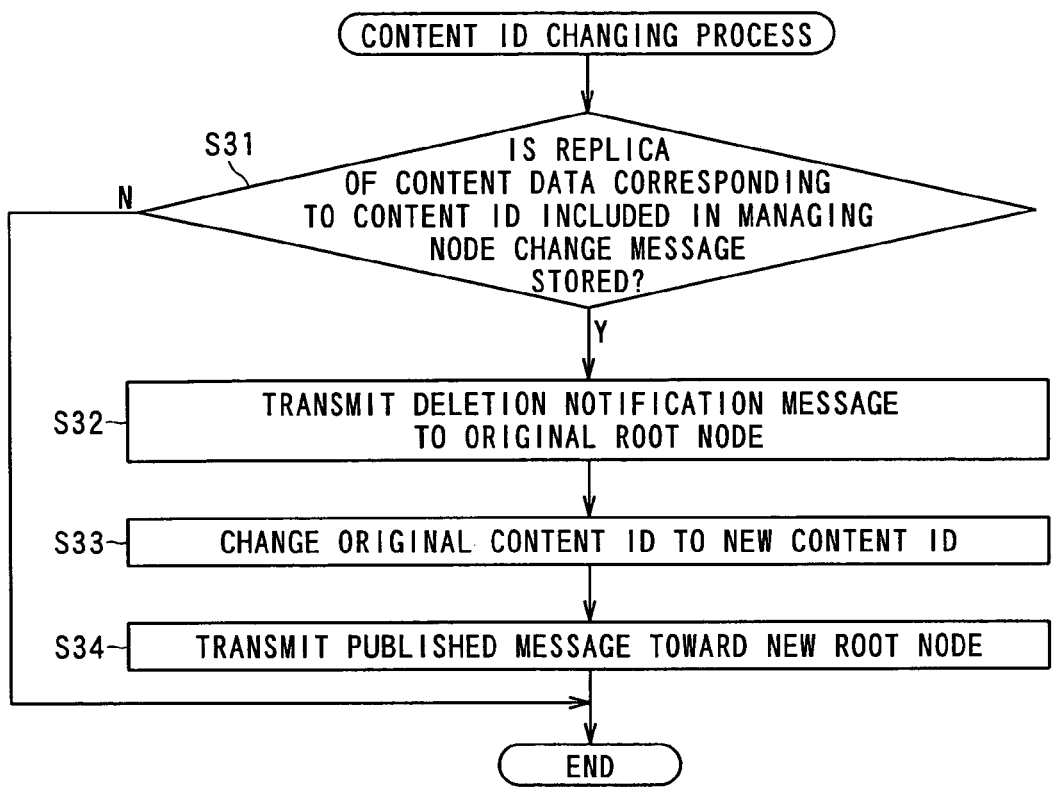
FIG. 9 is a flowchart showing an example of a content ID issuing process in a content list management server 2b.
Figure 11:
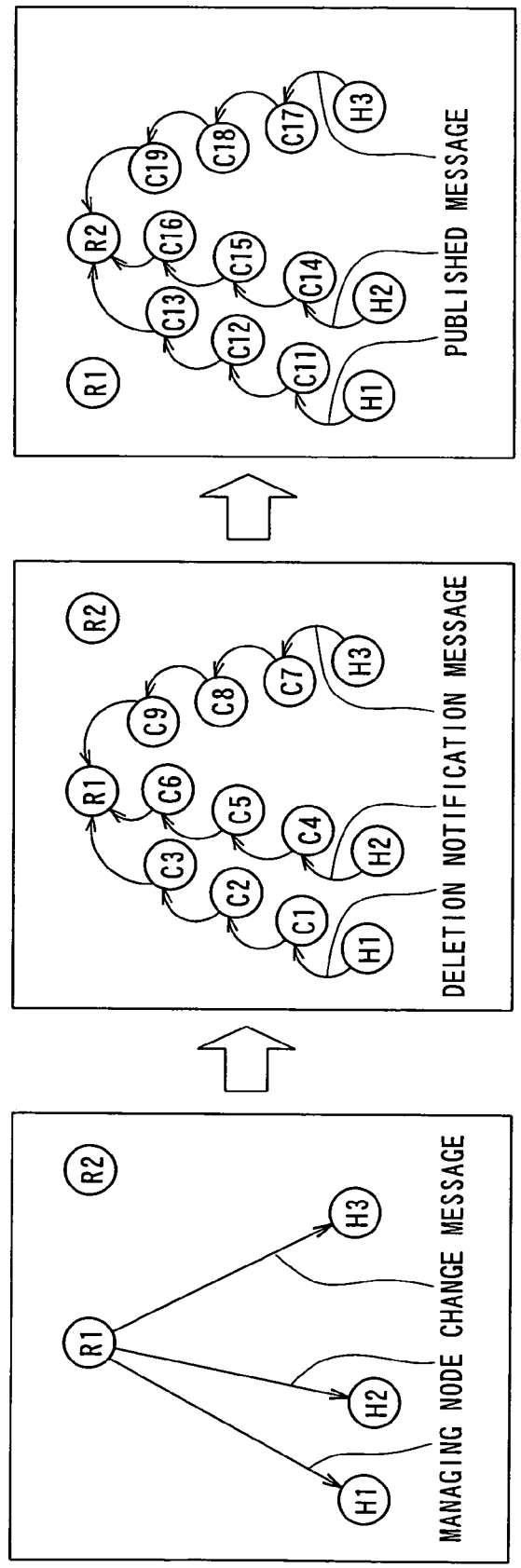
FIGS. 11A, 11B, and 11C are diagrams showing an example of the flows of various messages after division of node information is determined.

FIG. 6 is a flowchart showing an example of the node information registering process in the node nn. FIG. 7 is a flowchart showing an example of a node information dividing process in the node nn. FIG. 8 is a flowchart showing an example of a content ID issuing process in the content list management server 2*b*. FIG. 9 is a flowchart showing an example of a content ID changing process in the node nn. FIG. 10 is a diagram showing an example of node information stored in an index cache area at the time of determining division of node information. FIGS. 11A, 11B, and 11C are diagrams showing an example of the flows of various messages after division of node information is determined.

The process shown in FIG. 6 is started when an arbitrary node nn receives a published message transmitted (transferred) from another node nn. The start is triggered, in the case where the system administrator enters new content (that is, stores a replica of the new content) to an arbitrary node nn, in the case where an arbitrary node nn views content and generates a replica of the content in the node nn itself, or in the case where a new content ID is given to existing content in the node nn, when the node nn transmits a published message to register the location of the content to the root node.

First, the control unit 11 refers to the routing table of the DHT of itself (the node of itself) and determines whether itself is the root node of the content ID included in the published message or not (step S1). When it is determined that the node itself is not the root node (in other words, it is a cache node) (for example, the node nn having the node ID closest to the content ID (for example, the node ID having the largest number of upper digits matched with those of the content ID) is registered in the routing group of the DHT) (N in step S1), the control unit 11 advances to step S2. When it is determined that the node itself is the root node (for example, the node has the node ID closest to the content ID (for example, the node ID has the largest number of upper digits matched with those of the content ID)) (Y in step S1), the control unit 11 advances to step S3.

In step S2, the control unit 11 determines whether an index cache area (a cache area for storing index information) in the storing unit 12 is full (that is, no free space for storing node information) or not. When the index cache area is not full (N in step S2), the control unit 11 advances to step S4. When the index cache area is full (Y in step S2), the control unit 11 advances to step S5.

In step S4, the control unit 11 stores (registers) the node information included in the published message so as to be associated with the content ID into the index cache area, and advances to step S5.

In step S5, the control unit 11 obtains the IP address and the port number of the node nn as the transfer destination (for example, the node nn having the node ID closest to the content ID ("111") (for example, having the largest number of upper digits matched)) from the routing table of the DHT of itself, transfers the published message to the IP address and the port number, and finishes the process.

On the other hand, in step S3, like in step S2, the control unit 11 of the node nn (hereinbelow, called "root node R1") determines whether the index cache area in the storing unit 12 is full or not. When the index cache area is not full (N in step S3), the control unit 11 advances to step S7. When the index cache area is full (Y in step S3), the control unit 11 advances to step S6.

In step S6, the control unit 11 of the root node R1 deletes node information in accordance with predetermined deletion priority, for example, node information which is highest in the deletion priority from the node information stored in the index cache area. For example, node information of a content holding node that stores a replica of content data corresponding to a content ID managed as the root node R1 by the control unit 11 itself is set as node information which is low in the deletion priority (that is, which is not set as node information to be deleted). On the other hand, node information of a content holding node that stores a replica of content data corresponding to a content ID which is not managed as the root node R1 by the control unit 11 itself (that is, which is managed as a cache node) is set as node information which is high in the deletion priority (that is, which is set as node information to be deleted).

Further, higher deletion priority is set for node information of a content holding node that stores a replica of content data which is low in access frequency (for example, low in frequency of transmitting node information to the user node in accordance with a content location inquiry message) among the node information of the content holding nodes storing replicas of content data corresponding to content IDs which are not managed as the root node R1 by the control unit 11 itself. In the case where the index cache area is full, by the process in the step S6, the node information stored in the index cache area is changed from node information which is high in the deletion priority to node information which is low in the deletion priority.

In step S7, the control unit 11 of the root node R1 stores (registers) the node information included in the published message so as to be associated with the content ID into the index cache area.

Next, the control unit 11 of the root node R1 determines whether or not the amount of entire node information of the content holding node that stores the replica of the content data corresponding to the content ID ("111") (the amount of node information to be managed by the control unit 11 itself as the root node) has increased by a predetermined reference amount (for example, the storage amount of 90% of the index cache area) or larger (that is, whether the entire node information corresponding to the content ID ("111") has increased by a considerable amount or not) (step S8). The reference amount is not limited to 90% of the amount but an arbitrary amount can be set. The reference amount can be expressed by a reference number, and it may be determined whether the number of pieces of the entire node information is equal to or larger than the predetermined reference number. It may be also determined whether the node information is larger than a predetermined reference amount or a predetermined reference number or not.

When the amount is less than the predetermined reference amount (N in step S8), the control unit 11 finishes the process. When the amount is equal to or larger than the predetermined reference amount (Y in step S8), the control unit 11 determines that a part of the node information (for example, the half of the node information) is divided and makes a new root node (hereinbelow, called "root node R2") manage it (step S9). The control unit 11 executes the node information dividing process (step S10).

In the example shown in FIG. 10, the amount of the entire node information of a content holding node that stores a replica of content data corresponding to the content ID ("111") exceeds a reference amount (for example, the storage amount of 90% of the index cache area). Consequently, the half of the node information expressed by reference numeral 51 is managed by the root node R2.

In the node information dividing process, as shown in FIG. 7, for example, the control unit 11 of the root node R1 connects to the content list management server 2b in accordance with the IP address and the port number of the content list management server 2b obtained on participation to the overlay network 9, and demands issuance of a new content ID of content data corresponding to the content ID ("111") (step S11).

When the content ID issue request is received, the content list management server 2b starts the content ID issuing process shown in FIG. 8, and generates a new content ID which is not yet registered in the content list (step S21). For example, the content list management server 2b generates a content ID (such as "121") by hashing "XXX2" obtained by adding numerical value "2" to the end of the content name "XXX" of content data corresponding to the content ID ("111") with the hash function and temporarily stores the content ID in the RAM.

Subsequently, the content list management server 2b determines whether or not the amount of entire node information corresponding to a content ID which is already managed by the root node (new root node) of the generated new content ID ("121") is less than the half of the predetermined reference amount in the step S8 (step S22). Since the case where the root node R2 of the content ID ("121") is already the root node R2 of another content ID is also assumed (that is, the case where the node ID of the root node R2 is the closest to two or more content IDs is also assumed), the above determination process is performed to assure a storage area in the index cache area for managing the divided node information.

For example, "the amount of entire node information to be divided by the original root node R1+ the amount of node information corresponding to the content ID already managed as a root node by a new root node" has to be smaller than the predetermined reference amount (for example, the storage amount of 90% of the index cache area). Therefore, when the amount of the entire node information to be divided by the original root node R1 is, for example, a storage amount of 45% of the index cache area, the amount of node information corresponding to the content ID already managed by a new root node has to be less than the storage amount of 45% of the index cache area.

For example, the content list management server 2b transmits a message to determining whether the amount is less than the half of the predetermined reference amount or not to the root node R2 of a content ID ("121") by DHT routing using the content ID ("121") as a key. In the case where a response message that the amount is less than the half of the predetermined reference amount is received from the root node R2, it is determined that the amount is less than the half of the predetermined reference amount (Y in step S22), and the program advances to step S23. In such a manner, the divided node information can be managed reliably in the new root node R2.

When the response message that the amount is less than the half of the predetermined reference amount is received from the root node R2, the content list management server 2b determines that the amount is not less than the half of the predetermined reference amount (N in step S22). The content list management server 2b discards the content ID ("121")

stored in the RAM, returns to step S21, generates a content ID for a new root node again, and performs the process in step S22. In this case, for example, the content list management server 2b generates a content ID by hashing "XXX3" obtained by adding the numerical value "3" (that is, the number at the end increases by a predetermined value (for example, 1) each time the process is repeated) to the end of the content name "XXX" of content data corresponding to the content ID ("111") with the hash function.

In step S23, the content list management server 2b transmits a content ID issue message including the new content ID (such as "121") generated and temporarily stored in the RAM to the root node R1 as the node requesting issue of a new content ID of the content data.

The content list management server 2b registers the new content ID (such as "121") as a new content ID of content data corresponding to the original content ID ("111") into a content list, and updates (upgrades the version of) the content list (step S24).

Subsequently, the content list management server 2b transmits the updated content list to all of the nodes nn participating in the overlay network 9 (step S25) and finishes the process.

The control unit 11 of the root node R1 as the source of requesting issue of a new content ID receives a content ID issue message from the content list management server 2b, and obtains the new content ID (such as "121") (that is, a new content ID to be associated with content data corresponding to the divided node information) (step S12).

The control unit 11 of the root node R1 divides the part of the node information (the node information as the half shown by reference numeral 51 in the example of FIG. 10) from the index information, obtains the divided node information from the index information, and transmits a managing node changing message including the original content ID ("111") and the new content ID ("121") (managing node change information indicating that the divided node information is managed by the new root node R2) to the IP addresses and port numbers of the content holding nodes (hereinbelow, called "content holding nodes H1 to H3") shown in the node information (although the three content holding nodes H1 to H3 are taken as an example, larger number of content holding nodes exist in reality) (step S13, refer to FIG. 11A).

The control unit 11 of the root node R1 deletes the divided node information (the node information as the half shown by reference numeral 51 in the example of FIG. 10) from the index cache area (step S14). As will be described later, on reception of the deletion notification messages transmitted from the content holding nodes H1 to H3, the control unit 11 of the root node R1 may delete the node information included in the deletion notification messages from the index cache area (one by one) (in this case, the divided node information may not be deleted in a lump in step S14). In such a manner, the node information can be deleted without a mistake.

After that, the control unit 11 of the root node R1 stores, as node information division history, the original content ID ("111"), the new content ID ("121") the amount (or the number of pieces) of node information corresponding to the original content ID ("111") stored in the index cache area just after division, and time information at the time of division so as to be associated with each other in the storing unit 12 (step S15), and finishes the process. The amount of node information corresponding to the content ID ("111") stored in the index cache area just after division is used for a node information merging process which will be described later.

Each of the content holding nodes H1 to H3 starts the content ID changing process shown in FIG. 9 on reception of the managing node change message from the root node R1. First, the control unit 11 determines whether a replica of content data corresponding to the content ID ("111") included in the managing node change message is stored or not (step S31). Such determination is made for a reason such that there may be a case that a replica of content data is already deleted from the content holding node but the information of the deletion has not been transmitted to the root node (due to a time lag, poor communication, or the like).

Subsequently, the control unit 11 of each of the content holding nodes H1 to H3 transmits (sends) a deletion notification message including the content ID ("111") included in the managing node change message and the node information of itself to the original root node R1 (step S32). Consequently, the deletion notification message is transferred to the root node R1 by the DHT routing using the content ID ("111") as a key as shown in FIG. 11B. Also in cache nodes C1 to C9 in the transfer path, node information included in the deletion notification message is deleted. As a result, the node information of an old content ID can be efficiently deleted.

The control unit 11 of each of the content holding nodes H1 to H3 specifies a replica of content data corresponding to the content ID ("111") and changes the original content ID ("111") to a new content ID ("121") included in the managing node change message (step S33). That is, the control unit 11 associates the new content ID ("121") to the replica and stores it.

The control unit 11 of each of the content holding nodes H1 to H3 transmits (sends) the published message including the new content ID ("121") and the node information of the node itself toward the new root node R2 (step S34). The published message is transferred to the root node R2 by the DHT routing using the content ID ("121") as a key as shown in FIG. 1C. The node information included in the published message is registered (stored) as index information in the index cache area in the root node R2 by the node information registering process shown in FIG. 6. Also in the cache nodes C11 to C19 in the transfer path of the published message, the node information included in the published message is registered (stored) in the index cache area. It completes the division of node information.

As described above, by the process of dividing the node information, even in the case where the index cache area in the root node brims, the node information is divided and the divided node information is managed by a new root node. Therefore, the number of root nodes can be properly changed according to the index information amount. Even when the number of replicas of content data is increased, accesses to the replica can be spread.

In the step S9, the control unit 11 of the root node R1 may determine the divided node information so as to disperse the load of the network 8. For example, belonged-group information indicative of a network connection group in the network 8, to which each of the nodes nn belongs is registered so as to be associated with node information in the index information. The control unit 11 obtains the belonged-group information and divides (separates) a part of the node information so that the node information indicative of the content holding nodes having the same belonged-group information is equally managed by different root nodes (for example, the root nodes R1 and R2). An example of the belonged-group information is AS (Autonomous System) number assigned from the range of 1 to 65535. The AS denotes a lump of networks having a single (common) operation policy and constructing the Internet. The Internet can be regarded as a collection of ASs. By dividing the information on the AS unit basis and managing the divided information, overhead of the routing is reduced, and management of the network 8 is facilitated. An AS number is determined, for example, when an IP address is assigned from an ISP (Internet Service Provider). The node nn itself can obtain the number of the AS to which the node nn itself belongs by a method of accessing the WHOIS database of the IRR (Internet Routing Registry) or JPNIC (Japan Network Information Center), a method of obtaining the AS number of a line by the user from the ISP and entering the obtained value in a node in advance by the user, or the like. In the embodiment, the ISP has been described as an example of a network connection group. The invention, however, is not limited to the ISP but other network operating organization or governing body may be employed.

As another example of determining divided node information so as to disperse the load on the network 8, the control unit 11 obtains the access frequency information indicative of frequency of access to the content holding node indicated in the node information (for example, totals the access frequencies from the content holding nodes), and divides (separates) a part of the node information so that the total of the frequencies of access to the content holding nodes is equally divided into, for example, the root nodes R1 and R2.

In the step S12, the root node R1 obtains a new content ID (for example, "121") from the content list management server 2b. However, the invention is not limited to the method. The root node R1 may generate and obtain the content ID (for example "121") by adding an arbitrary numerical value (for example, "2") to the end of the content name "XXX" of content data corresponding to the content ID ("111") and hashing the resultant with the hash function (in this case, the step S11 is unnecessary). In this case, each of the user nodes generates a content ID by hashing the "content name+arbitrary numeral value" written in the content list with the hash function. With such a configuration, the content list management server 2b is not always necessary.

In the above-described operation example, the root node R1 transmits the managing node change message to the content holding node written in the divided node information, and a published message is transmitted from the content holding node to the root node R2, so that the divided node information is managed in the root node R2. As another example, the root node R1 transmits the divided node information directly to the root node R2 (for example, by the DHT routing using a new content ID managed by the root node R2 as a key) so that the information is managed by the root node R2.

2-2. Deletion and Merge of Node Information

An operation example when deletion and merging of node information is performed will now be described with reference to FIGS. 12 to 17 and the like.

Figure 12:
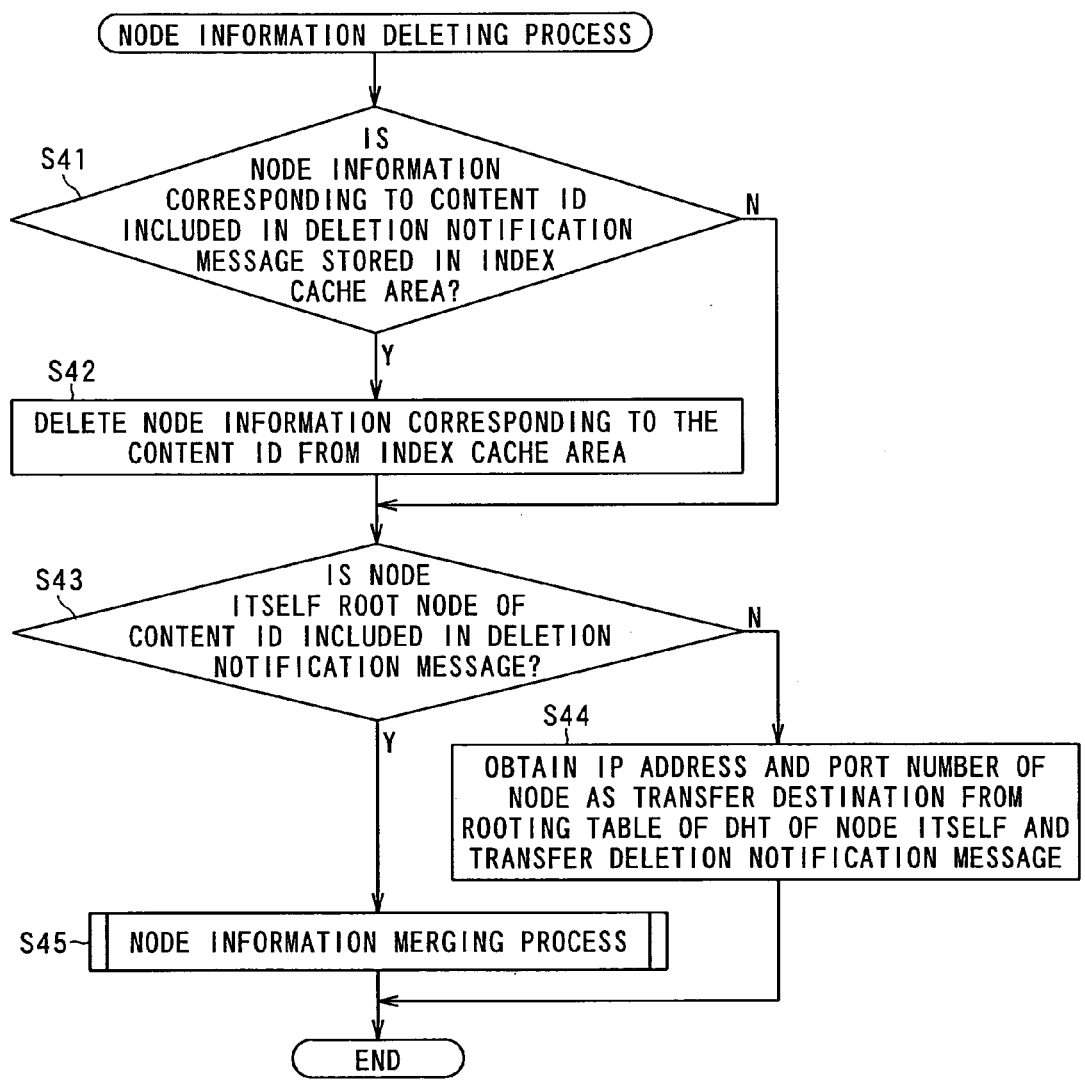
FIG. 12 is a flowchart showing an example of a node information deleting process in the node nn.
Figure 13:
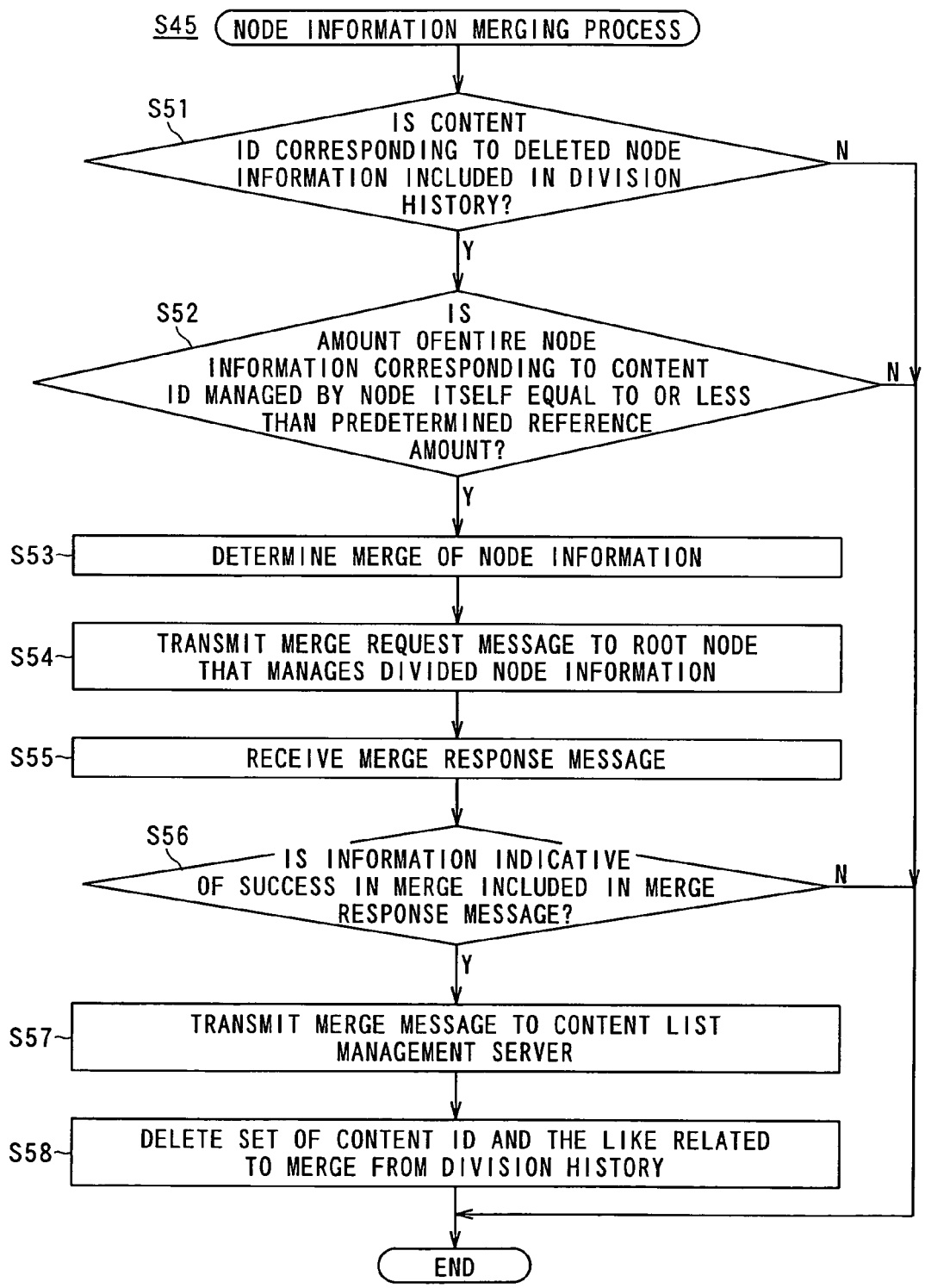
FIG. 13 is a flowchart showing an example of a node information merging process in the node nn (root node).
Figure 14:
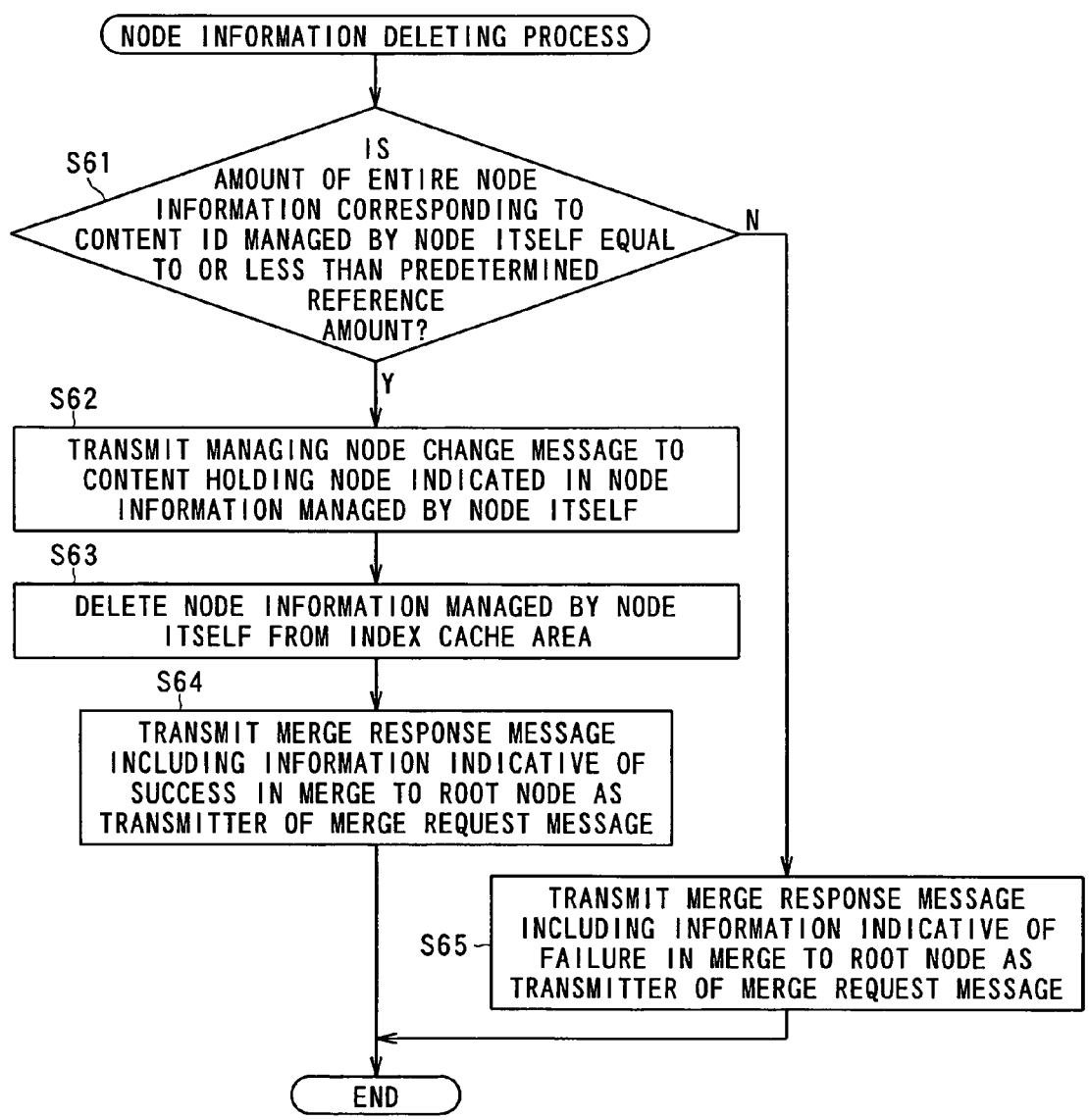
FIG. 14 is a flowchart showing an example of a node information deleting process in the node nn (root node).
Figure 15:
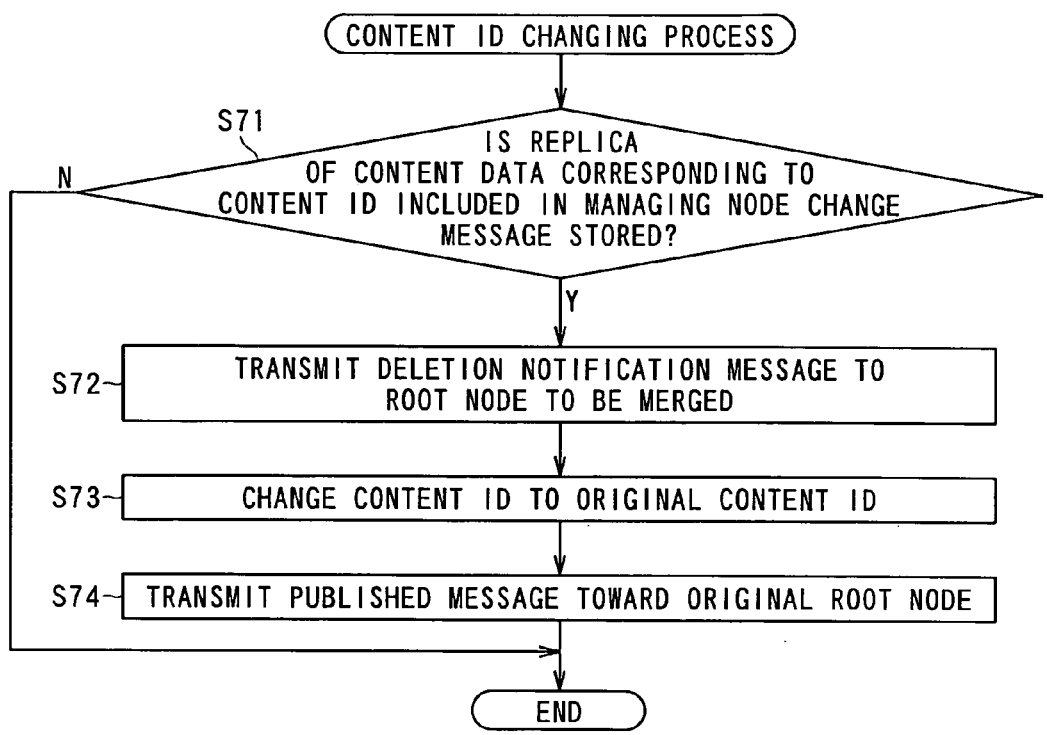
FIG. 15 is a flowchart showing an example of a content ID changing process.
Figure 16:
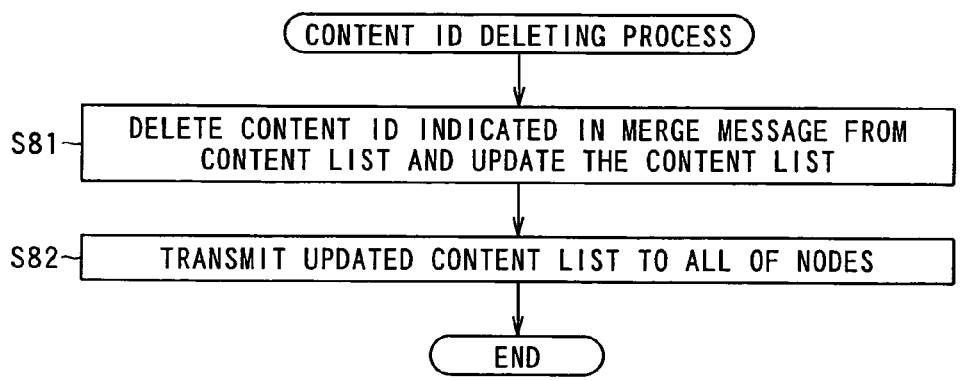
FIG. 16 is a flowchart showing an example of a content ID deleting (erasing) process in a content list management server 2b.

FIG. 12 is a flowchart showing an example of the node information deleting process in the node nn. FIG. 13 is a flowchart showing an example of a node information merging process in the node nn (root node). FIG. 14 is a flowchart showing an example of a node information deleting process in the node nn (root node). FIG. 15 is a flowchart showing an example of a content ID changing process. FIG. 16 is a flowchart showing an example of a content ID deleting (erasing) process in the content list management server 2b. FIG. 17 is a diagram showing an example of node information stored in an index cache area when merging of node information is determined. FIGS. 18A, 18B, and 18C are diagrams showing an example of the flows of various messages after merging of node information is determined.

The process shown in FIG. 12 starts when an arbitrary node nn receives the deletion notification message transmitted (or transferred) from another node nn. First, the control unit 11 determines whether node information included in the deletion notifying message and corresponding to the content ID included in the message is stored in the index cache area or not (whether the node information is registered as index information or not) (step S41). In the case where the node information is not stored (N in step S41), the control unit 11 advances to step S43. When the node information is stored (Y in step S41), the node information corresponding to the content ID is deleted from the index cache area (step S42) and the control unit 11 advances to step S43.

In step S43, the control unit 11 determines whether the node of the control unit 11 is the root node R1 (of the content ID (for example, "111")) of the node of itself or not. When it is determined that the node of the control unit 11 is not the root node R1 (in other words, a cache node) (N in step S43), the control unit 11 advances to step S44. When it is determined that the node of the control unit 11 is the root node R1 (Y in step S43), the control unit 11 advances to step S45.

In step S44, the control unit 11 obtains the IP address and the port number (for example, of the node nn having the node ID having the largest number of upper digits matched) closest to the node nn (the content ID ("111")) as a transfer destination from the routing table of the DHT of itself, transfers the deletion notification message to the IP address and the port number, and finishes the process.

On the other hand, in step S45, the control unit 11 of the root node R1 executes the node information merging process. In the node information merging process, as shown in FIG. 13, the control unit 11 of the root node R1 determines whether the content ID corresponding to the node information deleted in the step S42 is included in a division history stored in the storing unit 12 (step S51). When the content ID is not included in the division history (N in step S51), the control unit 11 finishes the process. When the content ID is included in the division history (Y in step S51), the control unit 11 advances to step S52.

It is assumed that the division history includes a set of the content ID ("111"), the content ID ("121"), and an amount of node information corresponding to the content ID ("111") stored in the index cache area immediately after division.

In step S52, the control unit 11 of the root node R1 determines whether the amount of all of node information of the content holding node that stores a replica of content data corresponding to the content ID ("111") managed as the root node by itself is equal to or less than the predetermined reference amount (for example, the amount of the half (50%) of the node information corresponding to the content ID ("111") stored in the index cache area just after division (that is, whether the entire node information corresponding to the content ID ("111") has decreased by considerable number of pieces or not). For example, when the node information to be managed as the root node becomes equal to or larger than 90% of the index cache area, in the case of using the node information dividing process, the node information corresponding to the content ID ("111") stored in the index cache area just after division becomes 45% of the index cache area. In step S52, whether the amount of the node information is equal to or less than the amount of the half (50%), that is, 22.5% of the index cache area or less is determined. The reference amount is not limited particularly to 50% but an arbitrary amount can be set. The reference amount may be expressed by the reference number of pieces, and it may be determined that whether or not the number of pieces of the entire node information is equal to or less than the predetermined reference number. It is also possible to determine whether the node information is less than a predetermined reference amount or a predetermined reference number or not.

When the amount of the node information is larger than the predetermined reference amount (N in step S52), the control unit 11 finishes the process. In the case where the amount of the node information is equal to or less than the predetermined reference amount (Y in step S52), the control unit 11 determines merging of the divided node information (for example, corresponding to the content ID ("121")) to the node information (for example, the content ID ("111")) stored in the index cache area of itself (step S53), and advances to step S54.

In the example of FIG. 17, the amount of the entire node information (original node information) of the content holding node that stores the replica of the content data corresponding to the content ID ("111") is smaller than the reference amount (for example, the amount of the half (50%) of the node information corresponding to the content ID ("111") stored in the index cache area immediately after division. Consequently, the node information corresponding to the content ID ("121") managed by the root node R2 is merged with the original node information, and managed by the root node R1.

In step S54, the control unit 11 of the root node R1 transmits (sends) a merge request message for merging node information corresponding to the content ID ("121") included in the division history (that is, divided node information) with node information corresponding to the content ID ("111") included in the division history (that is, the original node information) toward the root node R2 that manages the node information (divided node information) corresponding to the content ID ("121"). The merge request message includes, for example, the amount of the half (50%) of the node information corresponding to the IP address and the port number of the root node R1, the content ID ("121"), the content ID ("111"), and the content ID ("111") stored in the index cache area immediately after division. The merge request message is transferred to, for example, the root node R2 by the DHT routing using the content ID ("121") as a key.

On receipt of the merge request message, the control unit 11 of the root node R2 starts the node information merging process shown in FIG. 14, and determines whether or not the amount of the entire node information (node information corresponding to the merge request message) of the content holding node that stores the replica of the content data corresponding to the content ID ("121") managed by itself as a root node is equal to or smaller than a predetermined reference amount (for example, the amount of the half (50%) of the node information corresponding to the content ID ("111") stored in the index cache area just after division included in the merge request message) (step S61). The reference amount is not particularly limited to the amount of 50%, but an arbitrary amount can be set.

When the amount of the entire node information is equal to or less than the predetermined reference amount (Y in step S61), the control unit 11 advances to step S62. When the amount is larger than the predetermined reference amount (N in step S61), the control unit 11 advances to step S65.

In step S62, the control unit 11 of the root node R2 transmits the managing node change message including the content ID ("111") and the content ID ("121") (managing node change information indicating that the node information corresponding to the content ID ("121") managed by the root node R2 is managed by the original root node R1) to the IP addresses and port numbers of the content holding nodes H1 to H3 written in the node information corresponding to the content ID ("121") managed by itself as a root node (node information corresponding to the merge request message) stored in the index cache area (refer to FIG. 18A).

Next, the control unit 11 of the root node R2 deletes the node information corresponding to the content ID ("121") from the index cache area (the node information corresponding to the merge request message and managed by itself as a root node) (step S63). As will be described later, on receipt of the deletion notification messages transmitted from the content holding nodes H1 to H3, the control unit 11 of the root node R2 may delete node information included in the deletion notification message (one by one) from the index cache area (in this case, it is unnecessary to delete the divided node information in a lump in step S63).

Subsequently, the control unit 11 of the root node R2 transmits the merge response message including information indicative of a success in merging to the root node R1 as the transmitter of the merge request message (step S64), and finishes the process.

On the other hand, in step S65, the control unit 11 of the root node R2 transmits a merge response message including information indicative of a failure in merging to the root node R1 as the transmitter of the merge request message, and finishes the process.

As shown in FIG. 13, on receipt of the merge response message from the root node R2 (step S55), the control unit 11 of the root node R1 as the transmitter of the merge request message determines whether the merge response message includes information indicative of a success in merging or not (step S56). In the case where the information indicative of a success in merging is not included (that is, information indicative of a failure in merging is included) (N in step S56), the process is finished. When the information indicative of a success in merging is included (Y in step S56), the control unit 11 advances to step S57.

In step S57, the control unit 11 of the root node R1 transmits a merge message indicating that the node information corresponding to the content ID ("121") is merged with the node information corresponding to the content ID ("111") to the content list management server 2b.

The control unit 11 of the root node R1 deletes the set of the content ID ("111") related to the merge, the content ID ("121"), and the amount of node information corresponding to the content ID ("111") stored in the index cache area immediately after division from the division history stored in the storing unit 12 (step S58) and finishes the process.

On the other hand, on receipt of the managing node change message from the root node R2 (the managing node change message transmitted in the step S62), each of the content holding nodes H1 to H3 starts the content ID changing process shown in FIG. 15. First, the control unit 11 determines whether a replica of the content data corresponding to the content ID ("121") is stored or not (step S71).

Next, the control unit 11 of each of the content holding nodes H1 to H3 transmits the deletion notification message including the content ID ("121") included in the managing node change message and the node information of itself toward the root node R2 to be merged (step S72). The deletion notification message is transferred to the root node R2 by the DHT routing using the content ID ("121") as a key as shown in FIG. 18B. Also in the cache nodes C11 to C19 in the transfer path, the node information included in the deletion notification message is deleted. Thus, the node information related to an old content ID can be efficiently deleted.

Subsequently, the control unit 11 of each of the content holding nodes H1 to H3 specifies a replica of content data corresponding to the content ID ("121") and changes the content ID ("121") to the original content ID ("111") included in the managing node change message (step S73). That is, the control unit 11 associates the original content ID ("111") to the replica and stores it.

The control unit 11 of each of the content holding nodes H1 to H3 transmits the published message including the original content ID ("111") and the node information of the node itself toward the original root node R1 (step S74). The published message is transferred to the root node R1 by the DHT routing using the content ID ("111") as a key as shown in FIG. 18C. The node information included in the published message is registered (stored) as index information in the index cache area in the root node R1 by the node information registering process shown in FIG. 6. Also in the cache nodes C1 to C9 in the transfer path of the published message, the node information included in the published message is registered (stored) in the index cache area. It completes the merge of node information.

On the other hand, on reception of the merge message from the root node R1 (the merge message transmitted in the step S57), the content list management server 2b starts a content ID deleting (erasing) process shown in FIG. 16. The content list management server 2b deletes (erases) the content ID (for example, "121") written in the merge message from the content list, and updates (upgrades the version of) the content list (step S81).

Subsequently, the content list management server 2b transmits the updated content list to all of the nodes nn participating in the overlay network 9 (step S82) and finishes the process.

As described above, by the process related to merge of the node information, even in the case where the number of the content holding nodes decreases in association with decrease in the frequency of access to, for example, the content holding node, the divided node information is merged, and the merged node information is managed by the original root node. Therefore, the number of root nodes can be properly changed according to the index information amount, and the efficiency of inquiry to the root node does not deteriorate. Thus, there is no unnecessary root node, and it is preferable also from the viewpoint of maintenance.

2-3. Delete and Merge of Node Information (Handling of Multiple Division)

With reference to FIGS. 19 to 22 and the like, an operation example in the case of merging node information after multiple division of node information is performed will be described.

The multiple division denotes that a number of pieces of node information of single content are divided into three or more pieces by the node information dividing process shown in FIG. 7. By the operation, the index information is managed by three or more root nodes with respect to one piece of content.

Figure 19:
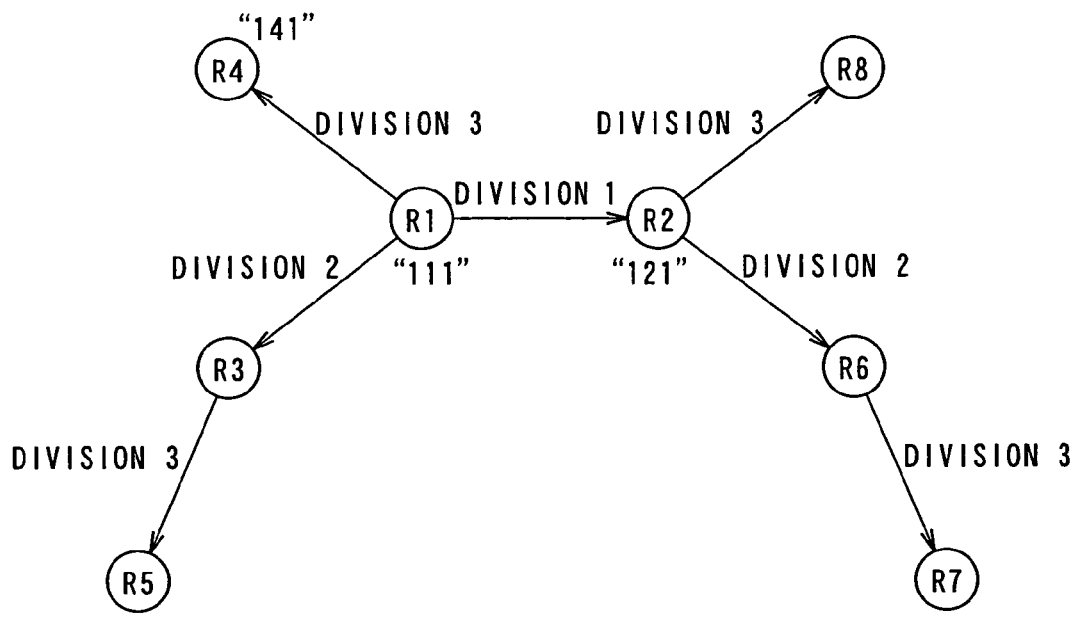
FIG. 19 is a diagram showing an example of a state of multiple division of node information.
Figure 20:
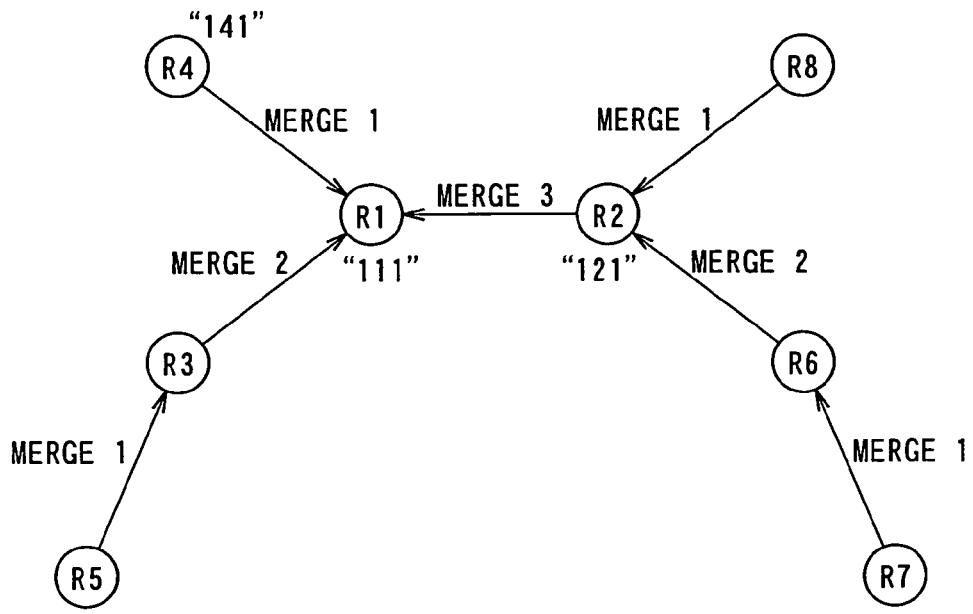
FIG. 20 is a diagram showing an example of a state where after the multiple division is performed, node information is merged.
Figure 21:
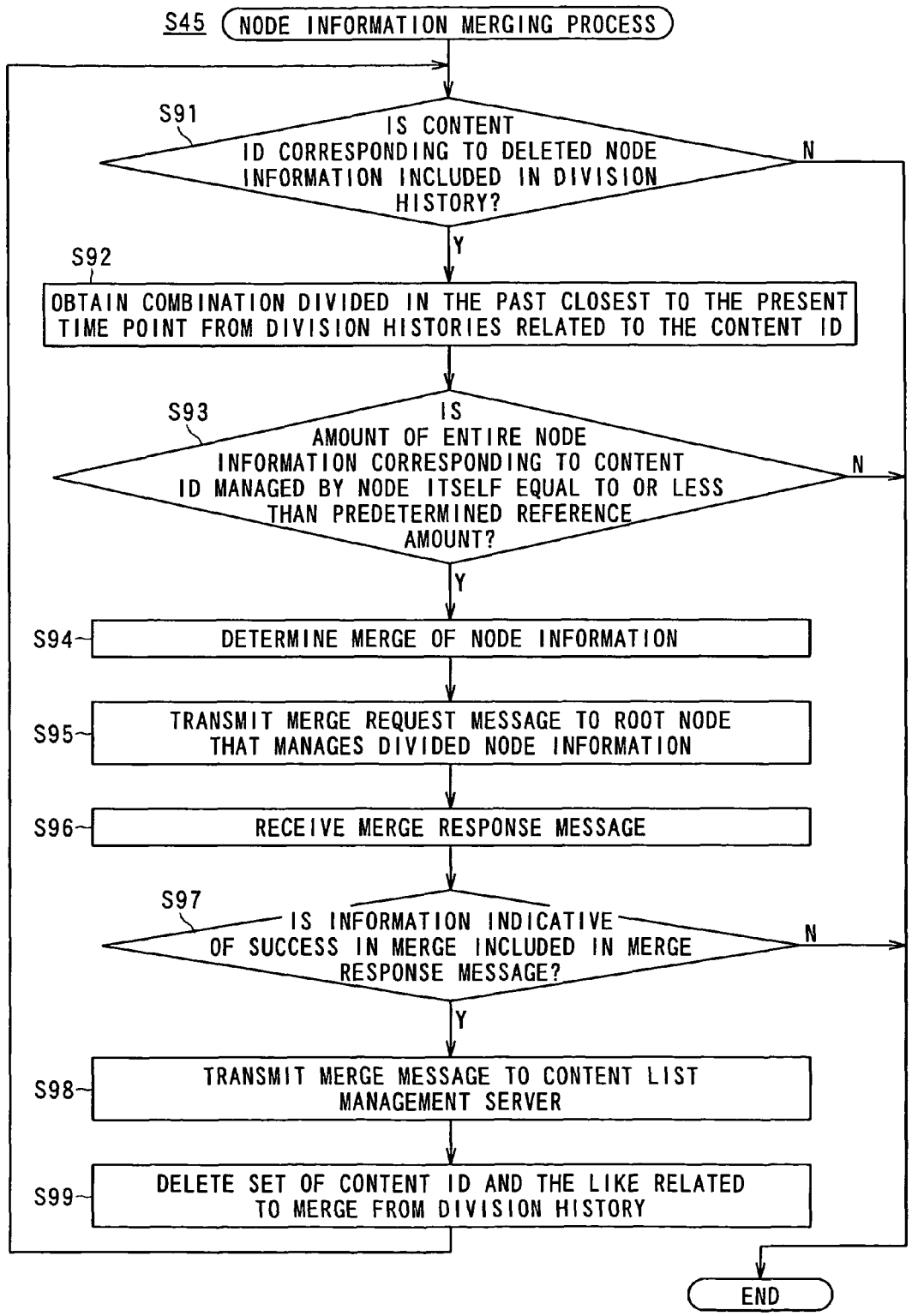
FIG. 21 is a flowchart showing an example of the node information merging process in a root node considering multiple division.
Figure 22:
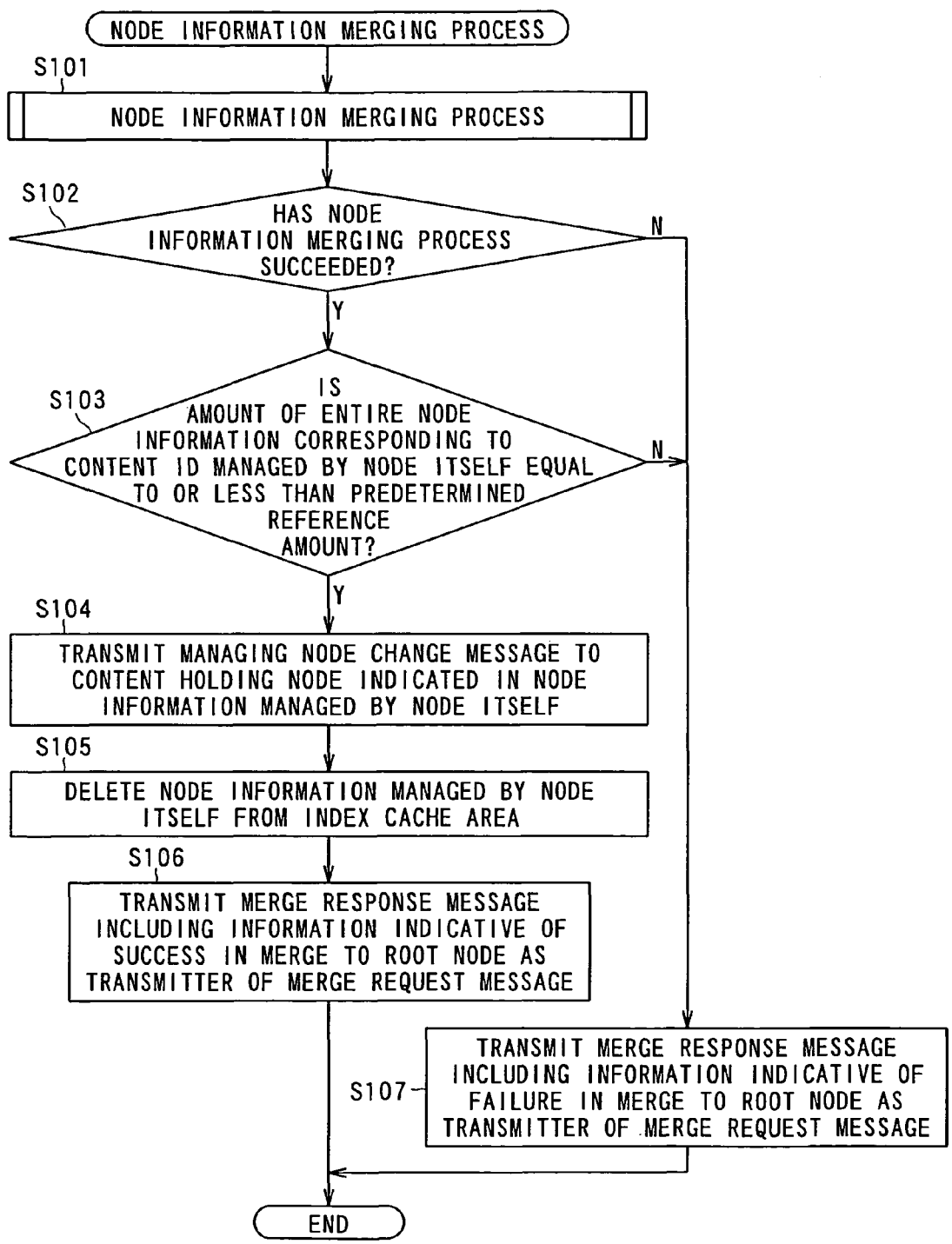
FIG. 22 is a flowchart showing an example of the node information deleting process in the root node considering multiple division.

FIG. 19 is a diagram showing an example of the state of multiple division of node information. FIG. 20 is a diagram showing an example of a state where multiple division is performed and, after that, node information is merged. FIG. 21 is a flowchart showing an example of the node information merging process in a root node considering multiple division. FIG. 22 is a flowchart showing an example of the node information deleting process in the root node considering multiple division.

The node information merging process shown in FIG. 21 is performed in place of the node information merging process shown in FIG. 13 when the multiple division is considered. The node information deleting process shown in FIG. 22 is performed in place of the node information merging process shown in FIG. 14 when the multiple division is considered. Therefore, also in the operation in the case where the multiple division is performed and, after that, the node information is merged, the node information deleting process shown in FIG. 12, the content ID changing process shown in FIG. 15, and the content ID deleting (erasing) process shown in FIG. 16 are similarly performed (repetitive description on those processes will not be given).

In the example of FIG. 19, eight root nodes R1 to R8 are used for single content by the multiple division. Numerals (1 to 3) added to "division" in the diagram show the order of division of node information (that is, in the example, division is performed in order of division 1→division 2→division 3). In the example of FIG. 19, the root node R1 divides node information from index information managed by itself by three times like the root node R2→root node R3→root node R4 in order. In the case where such multiple division is performed, each of the root nodes basically knows only division performed by itself (for example, in the example of FIG. 19, the root node R1 does not know division performed by the root node R2). Consequently, the root node R1 merges node information divided by itself with responsibility and, as shown in FIG. 20, the merge is performed in the order opposite to that at the time of division (the order of merge 1→merge 2→merge 3, that is, merge performed from the node information divided in the past closest to the present time point).

In the case where the node information merging process shown in FIG. 21 is performed in the root node R1 shown in FIGS. 19 and 20, first, the control unit 11 determines whether the content ID (for example, "111") corresponding to the node information deleted in the step S42 is included in the division history stored in the storing unit 12 or not (step S91). When the content ID is not included in the division history (N in step S91), the process is finished. When the content ID is included in the division history (Y in step S91), the control unit 11 advances to step S92.

In step S92, in the case where the process is performed in the root node R1, the control unit 11 refers to time information of each of divisions included in the division history, and obtains a combination of division (a set of amounts of node information corresponding to the original content ID, the content ID related to division, and the content ID stored in the index cache area immediately after division) in the past closest to the present time point in the division related to the content ID ("111"). In the example of FIG. 20, division to the root node R4 is the closest.

In step S93, like in step S52, the control unit 11 of the root node 1 determines whether the amount of entire node information of the content holding node that stores the replica of the content data corresponding to the content ID ("111") is equal to or less than the predetermined reference amount.

When the amount of the entire node information is larger than the predetermined reference amount (N in step S93), the control unit 11 finishes the process. When the amount is equal to or less than the predetermined reference amount (Y in step S93), the control unit 11 determines to merge the node information (for example, corresponding to a content ID ("141") related to the division (divided information) to the node information (for example, corresponding to the content ID ("111")) stored in the index cache area in itself (that is, when the node information is divided by a plurality of times, it is determined to merge node information most recently divided among the plurality of times of divisions to the node information managed by the original root node R1) (step S94), and advances to step S95.

In step S95, the control unit 11 of the root node R1 transmits the merge request message of merging the node information corresponding to the content ID ("141") included in the division history to the node information corresponding to the content ID ("111") included in the division history toward the root node R4 that manages the node information corresponding to the content ID ("141"). The merge request message includes, for example, the amount of the half (50%) of the node information corresponding to the IP address and the port number of the root node R1, the content ID ("141"), the content ID ("111"), and the content ID ("111") stored in the index cache area immediately after division. The merge request message is transferred to, for example, the root node R4 by the DHT routing using the content ID ("141") as a key.

On receipt of the merge request message, the control unit 11 of the root node R4 starts the node information deleting process shown in FIG. 22, and executes (recursively) a node information merging process shown in FIG. 21 (step S101). Also in the node information merging process, the processes in the step S91 and subsequent steps are performed. In step S102, whether or not the index merging process has been succeeded or not. For example, in the node information merging process shown in FIG. 21 executed in step S101, in the case where the content ID (for example, "141") is not included in the division history (N in step S91) and the node information merging process is finished, it is determined in step S102 that the index merging process has succeeded (Y in step S102), and the control unit 11 advances to step S103. When it is determined as "N (No)" in step S93 or S97 and the node information merging process is finished, it is determined in step S102 that the index merging process fails (N in step S102), the control unit 11 advances to step S107.

In step S103, the control unit 11 of the root node R4 determines whether the amount of the entire node information of the content holding node that holds the replica of the content data corresponding to the content ID ("141") managed by itself as a root node is equal to or less than the predetermined reference amount (similar to the step S61). When the amount of the entire node information is equal to or less than the predetermined reference amount (Y in step S103), the control unit 11 advances to step S104. When the amount of the entire node information is larger than the predetermined reference amount (N in step S103), the control unit 11 advances to step S107.

In step S104, the control unit 11 of the root node R4 transmits the managing node change message including the content ID ("111") and the content ID ("141") (managing node change information indicating that the node information corresponding to the content ID ("141") managed by the root node R4 is managed by the original root node R1) to the IP addresses and port numbers of the content holding nodes written in the node information corresponding to the content ID ("141"), stored in the index cache area.

Next, the control unit 11 of the root node R4 deletes the node information corresponding to the content ID ("141") from the index cache area (step S105).

Subsequently, the control unit 11 of the root node R4 transmits the merge response message including information indicative of a success in merging to the root node R1 as the transmitter of the merge request message (step S106), and finishes the process.

On the other hand, in step S107, the control unit 11 of the root node R4 transmits a merge response message including information indicative of a failure in merging to the root node R1 as the transmitter of the merge request message, and finishes the process.

As shown in FIG. 21, on receipt of the merge response message from the root node R4 (step S96), the control unit 11 of the root node R1 as the transmitter of the merge request message determines whether the merge response message includes information indicative of a success in merging or not (step S97). In the case where the information indicative of a success in merging is not included (N in step S97), the process is finished. When the information indicative of a success in merging is included (Y in step S97), the control unit 11 advances to step S98.

In step S98, the control unit 11 of the root node R1 transmits a merge message indicating that the node information corresponding to the content ID ("141") is merged with the node information corresponding to the content ID ("111") to the content list management server 2b.

The control unit 11 of the root node R1 deletes the set of the content ID ("111"), the content ID ("141"), and the amount of node information corresponding to the content ID ("111") stored in the index cache area immediately after division from the division history stored in the storing unit 12 (step S99) and returns to step S91. It completes merging of the node information managed by the root node R4.

Returned to step S91, whether the content ID (for example, "111") is included in the division history still stored in the storing unit 12 or not is determined again. In the example of FIG. 19, the root node R3 still exists, so that a process for merging the node information managed by the root node R3 is performed. Since the root node R3 divides the node information and makes the root node R5 manage the divided node information, in the case where the node information deleting process shown in FIG. 22 is performed in the root node R3, the node information managed by the root node R5 in the node information merging process shown in FIG. 21 executed in step S101 is merged to the node information managed y the root node R3. After that, the management source change message is transmitted to the content holding node indicated in the node information managed by the root node R3 after the merge. The node information managed by the root node R3 after the merge is merged with the node information managed by the root node R1.

As described above, by the process related to merge of node information in which the multiple division is considered, even if the number of the content holding nodes decreases in association with decrease in the frequency of access to the content holding nodes after the multiple division, the multiple-divided node information can be merged more efficiently (to the original state).

Although the case of dividing node information and, after that, merging the divided node information has been described as an example in the foregoing embodiment, the merge of node information can be also applied to the case where the division of node information is not a precondition, that is, a plurality of root nodes are provided for single piece of content in advance.

Although the foregoing embodiments have been described on the precondition that the overlay network 9 constructed by an algorithm using the DHT is employed, the invention is not limited to the precondition.

The present invention is not limited to the foregoing embodiments. The embodiments are illustrative, and any techniques having substantially the same configurations and producing similar effects as those in the technical ideas described in the scope of claims of the present invention are embraced in the technical scope of the present invention.

The invention claimed is:

1. A node in an information distribution system comprising a plurality of nodes capable of performing communication with each other via a network and in which at least one distribution information is stored into a plurality of nodes, comprising:
   a first memory configured to store i) node information indicating a node that stores the distribution information, the distribution information being shared by the plurality of nodes, the node information including IP address of a node that stores the distribution information, and ii) instructions; and
   a first processor that is configured to execute the instructions to:
   determine that a part of the node information stored in the first memory is to be divided, in response to determining that an amount of the node information stored in the first memory becomes equal to or larger than a first predetermined reference amount;
   divide a part of the node information stored in the first memory, in accordance with the determination that the part of the node information stored in the first memory is to be divided;
   transmit the node information divided to another node; and
   delete the node information transmitted to the other node from the first memory.

2. The node according to claim 1,
   wherein in response to determining that information requesting deletion of node information which is managed by the other node is received from the node indicated in the node information managed by the other node, the first processor deletes the node information indicated in the received deletion request information from the first memory.

3. The node according to claim 1,
   wherein in response to determining that amount of node information to be managed by the node itself becomes equal to or larger than a second predetermined reference amount, the first processor determines that a part of the node information is divided and managed by the other node.

4. The node according to claim 1,
   wherein in response that the other node is determined to be managing node information, the first processor transmits managing node change information indicating that the node information is to be managed by the other node, to the node indicated in the node information to be managed by the other node.

5. The node according to claim 4,
   wherein in response to determining that node information is determined to be managing the other node, the first processor obtains other identification information to be associated with distribution information corresponding to the node information to be managed by the other node, and transmits the managing node change information including the other identification information to the node.

6. A node for receiving managing node change information sent from the node of claim 5, comprising:
   a second memory configured to store instructions, and
   a second processor that is configured to execute the instructions stored in the second memory to transmit the other identification information included in the received managing node change information together with registration request information including the node information of the node itself toward the other node.

7. The node according to claim 6,
   wherein the registration request information is a request for registering the node information also in a node existing in a transfer path to the other node.

8. A node for receiving managing node change information transmitted from the node according to claim 5, comprising:
   a second memory configured to store instructions, and
   a second processor that is configured to execute the instructions stored in the second memory to transmit identification information associated with distribution information corresponding to node information managed by the node which has transmitted the managing node change information, together with information requesting deletion of the node information of the node itself, toward the node.

9. The node according to claim 8,
   wherein the deletion request information denotes a request of deleting the node information in a node existing in a transfer path to the node which has transmitted the managing node change information.

10. A node for receiving managing node change information sent from the node of claim 4, comprising:
    a second memory configured to store instructions, and
    a second processor that is configured to execute the instructions stored in the second memory to transmit registration request information including the node information of the node itself to an other node indicated in the received managing node change information.

11. The node according to claim 1,
    wherein the first processor obtains belonging information to which the node indicated in the node information belongs, which is stored in the first memory, and belonging information indicative of a network connection group belonged to in the network, and
    wherein the first processor divides a part of the node information so that the node information indicative of the node having the same belonging information is to be managed by different nodes.

12. The node according to claim 1,
    wherein the first processor obtains access frequency information indicative of frequency of access to the node indicated in the node information stored in the first memory, and
    wherein the first processor divides a part of the node information so that total of access frequency to the node indicated in the node information is equally divided into the node itself and the other node on the basis of the access frequency information in the nodes.

13. The node according to claim 1,
    wherein the first processor in response to determining that the node information managed by the other node is deleted, and the amount of node information stored becomes equal to or less than the first predetermined reference amount, merges the divided node information managed by the other node to the node information stored.

14. The node according to claim 13,
    wherein the first processor, in response to determining that the merge is determined, merges information indicating that the divided node information which is managed by the other node is merged to the original node information to the other node.

15. A node for receiving merge information transmitted from the node according to claim 14, comprising:
    a second memory configured to store the node information and instructions;

a second processor that is configured to execute the instructions stored in the second memory to:

transmit managing node change information indicating that the node information is to be managed by the original node, to a node indicated in the node information corresponding to the merge information; and delete the node information corresponding to the merge information.

16. The node according to claim 15, wherein in response to determining that an amount of the node information corresponding to the merge information stored becomes equal to or smaller than a second predetermined reference amount, the second processor transmits the managing node change information to a node indicated in the node information corresponding to the merge information, and in response to determining that the amount of the node information corresponding to the merge information stored becomes equal to or smaller than the predetermined reference amount, the second processor deletes the node information corresponding to the merge information.

17. The node according to claim 15, wherein the second processor, in response to determining that a part of the node information corresponding to the merge information is further divided and managed by a further another node and an amount of the node information corresponding to the merge information becomes equal to or less than a second predetermined reference amount, determines that the further divided node information is merged to the node information corresponding to the merge information; and the second memory is configured to merge the further divided node information to the node information corresponding to the merge information and store the resultant information, wherein the second processor transmits the managing node change information to a node indicated in the node information corresponding to the merge information after the merge, and the second processor deletes the node information corresponding to the merge information after the merge.

18. A node for receiving managing node change information transmitted from the node according to claim 15, comprising:

a second memory configured to store instructions, and a second processor that is configured to execute the instructions stored in the second memory to:

transmit registration request information including the node information of the node itself, to the original node indicated in the received managing node change information.

19. A node for receiving managing node change information transmitted from the node according to claim 15, comprising:

a second memory configured to store instructions, and a second processor this is configured to execute the instructions stored in the second memory, wherein in response to that unique identification information is associated with the distribution information and the identification information is transmitted from one of the nodes, the identification information is transferred to a node that manages the node information corresponding to the distribution information associated with the identification information by an another node or a plurality of nodes, and the second processor transmits identification information associated with distribution information corresponding to the node information managed by the original node, together with registration request information of the node information of the node itself, toward the original node.

20. The node according to claim 19, wherein the registration request information denotes a request for registering the node information also in a node existing in a transfer path to the original node.

21. A node for receiving managing node change information transmitted from the node according to claim 15, comprising:

a second memory configured to store instructions, and a second processor that is configured to execute the instructions stored in the second memory, wherein in response to determining that unique identification information is associated with the distribution information and the identification information is transmitted from one of the nodes, the identification information is transferred to a node that manages the node information corresponding to the distribution information associated with the identification information by another node or a plurality of nodes, and the second processor transmits identification information associated with distribution information corresponding to node information managed by the node which has transmitted the managing node change information, together with information requesting deletion of the node information of the node itself, toward the node.

22. The node according to claim 21, wherein the deletion request information denotes a request for deleting the node information in a node existing in a transfer path to the node which has transmitted the managing node change information.

23. The node according to claim 13, wherein in response to determining that the node information is divided at a plurality of times, the first processor determines that node information most recently divided among a plurality of times is merged to the original node information.

24. A non-transitory recording medium in which a node process program for making a computer function as the node according to claim 1 is computer-readably recorded.

25. The node according to claim 1, wherein the information distribution system is a system in which at least one distribution information is stored into a plurality of the nodes via an overlay network constituted by the nodes, the first processor, in response to determining that a part of the node information stored in the first memory is divided by the first processor, generates an instruction of causing another node which is connected to the overlay network and is different from the node having stored the divided part of the node information, to store the divided part of the node information.

26. The node according to claim 25, wherein the first processor transmits the instruction generated to any one of the nodes connected to the overlay network.

27. A node in an information distribution system comprising a plurality of nodes capable of performing communication with each other via a network and in which at least one distribution information is stored into a plurality of nodes, wherein node information corresponding to same distribution information is divided and transmitted to another node, the node information being indicative of a node that stores the distribution information, the distribution information being shared by the plurality of nodes, the node information including IP address of a node that stores the distribution information, and the node comprises:

a first memory configured to store the node information and instructions; and a first processor that is configured to execute the instruction to:

determine that the node information corresponding to the same distribution information transmitted to the other node is to be merged to the stored node information, in response to determining that an amount of the stored node information becomes equal to or smaller than a predetermined reference amount, and merge the node information corresponding to the same distribution information transmitted to the other node, to the stored node information, in accordance with the determination that the node information corresponding to the same distribution information transmitted to the other node is to be merged.

28. An information distribution system comprising a plurality of nodes capable of performing communication with each other via a network and in which at least one distribution information is stored into a plurality of nodes, wherein a node for managing node information indicative of a node that stores copied distribution information, comprises:

a first memory configured to store i) the node information indicating a node that stores the distribution information, the distribution information being shared by the plurality of nodes, the node information including IP address of a node that stores the distribution information, and ii) instructions; and a first processor that is configured to execute the instructions to:

determine that a part of the node information stored in the first memory is to be divided, in response to determining that an amount of the node information stored in the first memory becomes equal to or larger than a predetermined reference amount;

divide a part of the node information stored in the first memory, in accordance with the determination that the part of the node information stored in the first memory is to be divided;

transmit the node information divided to another node, delete the node information transmitted to the other node from the first memory; and transmit managing node change information indicating that the node information is to be managed by the other node, to a node indicated in the node information managed by the other node, in response to determining that the node information is determined to be managed by the other node, and wherein the first processor of the node which receives the managing node change information transmitted transmits registration request information including the node information of the node itself, to another node indicated in the managing node change information received.

29. The information distribution system according to claim 28, wherein the first processor of the node for managing the node information indicative of the node that stores the copied distribution information, in response to determining that the node information managed by the other node is deleted, and then, the amount of node information stored becomes equal to or less than the predetermined reference amount, merges the divided node information managed by the other node to the node information stored; and in response to determining that the merge is determined, the first processor transmits merge information indicating that the divided node information which is managed by the new node is merged to the original node information, to the other node, and wherein a node that receives the transmitted merge information comprises:

a second processor, and a second memory configured to store the node information;

wherein the first processor transmits managing node change information indicating that the node information is to be managed by the original node, to a node indicated in the node information corresponding to the merge information; and the first processor deletes the node information corresponding to the merge information, and wherein the second processor of the node that has received the managing node change information transmitted transmits registration request information including the node information of the node itself, to the original node indicated in the managing node change information received.

30. An information distributing method in an information distribution system comprising a plurality of nodes capable of performing communication with each other via a network and in which at least one distribution information is stored into a plurality of nodes, wherein managing node information indicative of a node that stores the copied distribution information comprises:

storing the node information, the node information indicating a node that stores the distribution information, the distribution information being shared by the plurality of nodes, the node information including IP address of a node that stores the distribution information;

in response to determining that an amount of the node information stored in a first memory becomes equal to or larger than a predetermined reference amount, determining that a part of the node information stored in the first memory is to be divided;

dividing a part of the node information stored in the first memory, in accordance with the determination that the part of the node information stored in the first memory is to be divided;

transmitting the node information divided to an other node;

deleting the node information transmitted to other node from the node; and transmitting managing node change information indicating that the node information is to be managed by the other node, to a node indicated in the node information managed by the other node, in response to determining that the node information is determined to be managed by the other node, and wherein transmitting managing node change information comprises transmitting registration request information including the node information of the node itself, to another node indicated in the managing node change information received.

31. The information distributing method according to claim 30, wherein managing the node information indicative of the node that stores the copied distribution information further comprises:

determining to merge the divided node information managed by the other node to the node information stored, in response to determining that the node information managed by the other node is deleted, and then, the amount of node information stored becomes equal to or less than the predetermined reference amount; and transmitting merge information indicating that the divided node information which is managed by the new node is merged to the original node information, to the other node, in response to determining that the merge is determined, wherein a node that receives the transmitted merge information performs:

storing the node information;

transmitting managing node change information indicating that the node information is to be managed by the original node, to a node indicated in the node information corresponding to the merge information; and deleting the node information corresponding to the merge information, and wherein transmitting managing node change information comprises:

transmitting registration request information including the node information of the node itself, to the original node indicated in the managing node change information received.

* * * * *